United States Patent
Barnes

(10) Patent No.: US 12,110,991 B2
(45) Date of Patent: Oct. 8, 2024

(54) METHODS FOR JOINING LINED PIPES AND ASSOCIATED APPARATUS

(71) Applicant: FLOWLINING LIMITED, Edinburgh (GB)

(72) Inventor: Stephen Barnes, Edinburgh (GB)

(73) Assignee: FLOWLINING LIMITED, Edinburgh (GB)

(*) Notice: Subject to any disclaimer, the term of this patent is extended or adjusted under 35 U.S.C. 154(b) by 25 days.

(21) Appl. No.: 17/642,439

(22) PCT Filed: Nov. 10, 2020

(86) PCT No.: PCT/GB2020/052852
§ 371 (c)(1),
(2) Date: Mar. 11, 2022

(87) PCT Pub. No.: WO2021/094734
PCT Pub. Date: May 20, 2021

(65) Prior Publication Data
US 2022/0341515 A1     Oct. 27, 2022

(30) Foreign Application Priority Data

Nov. 13, 2019 (GB) ...................................... 1916543
May 6, 2020 (GB) ...................................... 2006741

(51) Int. Cl.
*F16L 13/02*     (2006.01)
*F16L 58/10*     (2006.01)
*F16L 58/18*     (2006.01)

(52) U.S. Cl.
CPC ....... *F16L 13/0263* (2013.01); *F16L 58/1018* (2013.01); *F16L 58/181* (2013.01)

(58) Field of Classification Search
CPC .. F16L 13/0263; F16L 58/1018; F16L 58/181
See application file for complete search history.

(56) References Cited

U.S. PATENT DOCUMENTS 3,508,766 A     4/1970 Kessler et al.
5,992,897 A *   11/1999 Hill ..................... F16L 13/0263
285/55

(Continued)

FOREIGN PATENT DOCUMENTS

GB     2298256 B     3/1998
GB     2560732 A     9/2018

(Continued)

OTHER PUBLICATIONS

GB Combined Search and Examination Report for GB1916543.0 dated Jul. 30, 2020.

*Primary Examiner* — Seahee Hong
(74) *Attorney, Agent, or Firm* — FisherBroyles, LLP

(57) ABSTRACT

Methods and apparatus for making lined pipelines in which pipes are joined together by attaching fittings at their ends and joining the fittings together. Within the joint there is a fit-up sleeve which forces liners against respective fittings and provides corresponding seals. Other seals can be provided by inserting sealing rings which force different portions of the liners against different portions of the fittings. The fit-up sleeve and sealing rings may force the liners against castellations which prevent movement of the liners. The fit-up sleeve may cooperate with insertion rims on the fittings to provide very accurate spacing, or touching edges which can be desirable if automatic welding is employed. The seals provided by the fit-up sleeve also eliminate backdraughts and assist welding operations. Furthermore, the fit-up sleeve permits pigging through the pipe joint and therefore along the length of the resulting lined pipeline. It is foreseen that the need for CRA components and CRA welding can be largely if not wholly dispensed with.

34 Claims, 13 Drawing Sheets

(56) References Cited

U.S. PATENT DOCUMENTS

| | | | |
|---|---|---|---|
| 2003/0047939 A1 | 3/2003 | Whitehead et al. | |
| 2006/0145479 A1* | 7/2006 | McIntyre | F16L 55/165 |
| | | | 285/370 |
| 2012/0280488 A1 | 11/2012 | Pionetti | |
| 2013/0114945 A1* | 5/2013 | Pionetti | B29C 66/1224 |
| | | | 392/472 |
| 2017/0254446 A1* | 9/2017 | Glejbøl | B32B 27/286 |
| 2018/0119850 A1* | 5/2018 | Barnes | F16L 59/20 |
| 2019/0316721 A1* | 10/2019 | Barnes | B29C 65/364 |
| 2022/0212395 A1* | 7/2022 | Smithson | B29C 63/46 |

FOREIGN PATENT DOCUMENTS

| | | | | |
|---|---|---|---|---|
| GB | 2560732 B | * | 7/2021 | B29C 63/346 |
| WO | WO95/22713 A1 | | 8/1995 | |
| WO | WO2004/015321 A1 | | 2/2004 | |
| WO | WO2017/037541 A1 | | 3/2017 | |

\* cited by examiner

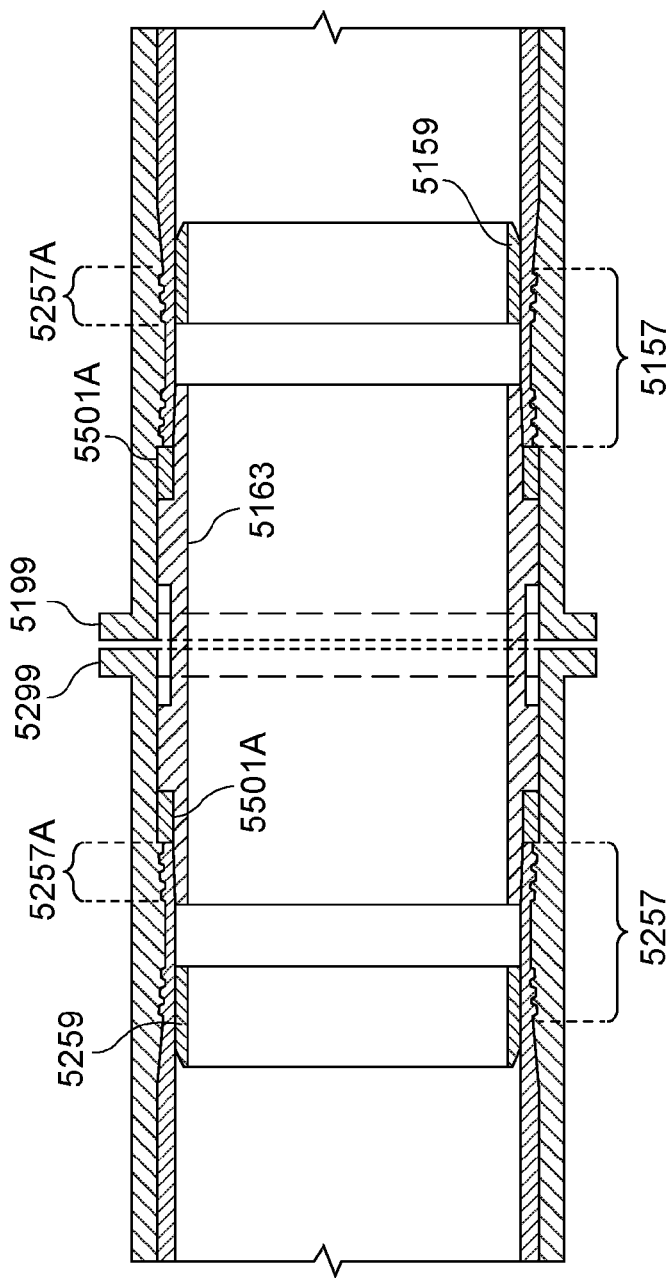

METHODS FOR JOINING LINED PIPES AND ASSOCIATED APPARATUS

The present invention relates to the field of hydrocarbon service, and in particular pipelines comprising liners for corrosion prevention. More specifically, the present invention relates to improvements to methods of joining lined pipes that increase the integrity, reliability and utility of the resulting lined pipelines, as well as reducing complexity and simplifying fabrication and/or construction.

Background to the Invention

British Patent Number GB 2,186,340, in the name of British Gas, discloses a method of lining a buried gas, water or sewage pipe using a synthetic resin liner having an external diameter greater than the internal diameter of the pipe. The liner is heated, pulled through a die which reduces its external diameter and then through the pipe to be lined. Thereafter the liner is pressurised such that it expands into contact with the internal wall of the pipe.

United States Patent Number U.S. Pat. No. 6,240,612, also in the name of British Gas, discloses a similar method of lining installed pipework in which the external diameter of a liner made from a memory retaining plastics material is reduced by up to 15% by pulling the liner through a die at ambient temperature. After pulling through the pipework the liner is allowed to expand within the pipework by relaxation of pulling tension followed by memory induced expansion at ambient temperature and pressure. This expansion into contact with the internal wall of the pipe is generally referred to as "reversion".

This pipe lining technique, developed by British Gas and subsequently refined for the oil and gas industry by Swagelining Limited, and other similar techniques have been used to extend and optimise the life and performance of new and existing pipelines, as an alternative to corrosion resistant alloys (CRA). Depending on the respective materials chosen, a polymer lined carbon steel pipeline can be up to 50% cheaper to produce than a solid CRA pipeline or a pipeline clad or lined with CRA. Typically, such a pipeline is constructed by joining together lengths (or stalks) of lined metal pipe.

British Patent Number GB2298256B, again in the name of British Gas, describes a method of joining lined pipes in which a tubular carbon steel fitting is welded to corresponding ends of the pipes to be joined. The inner surface of each fitting is provided with a corrosion resistant alloy (CRA) cladding and a series of annular grooves and castellations. The pipes (and fittings welded thereto) are then lined with a polyethylene liner, for example using the above-mentioned reduction (via a swaging die), insertion and reversion technique. A compression ring is then inserted into the ends of each fitting such that the respective liners are forced into the annular grooves and against the castellations. The fittings are then welded together by an annular girth weld. This is known in the art as a WeldLink connection.

However, this approach results in a section of pipeline proximate the weld which is unlined and is therefore exposed to potentially corrosive species. It also requires the use of corrosion resistant alloy (CRA) cladding because this section of pipeline is so exposed. Furthermore, the step change in internal diameter of the pipeline between the lined section and the section in the region of the weld, makes such pipelines incompatible with pigging operations, although it is disclosed that an optional annulus of liner material might mitigate this problem.

European Patent Number EP0366299, in the name of the Welding Institute, discloses an alternative way of joining lined pipe sections. A tubular thermoplastic body is inserted into the ends of two pipe sections, lined with polyethylene (for example) liners, which are to be joined. This body, termed an "electrofusion fitting", has heating coils at each end thereof which, when energised, melt and thereby create an electrofused joint between the fitting and the pipe linings. British Patent Number GB2297135B, in the name of British Gas, discloses an alternative arrangement in which the liners are machined to create a recess which receives the electrofusion fitting.

European Patent Number EP2334970B1, in the name of Pioneer Lining Technology Limited, discloses an alternative electrofusion fitting in which the girth weld between adjacent pipe lengths is not contaminated by the electrical leads which deliver power to the heating coils. Rather, EP2334970B1 discloses that the electrical leads from the heater coils extend through the electrofusion fitting and emerge at its inner face for connection to a source of power.

Despite the genuinely significant cost advantage of specifying a polymer lined carbon steel pipeline, and available technologies for cost-effectively producing same including the above-mentioned electrofusion fittings and associated methods, the pipeline industry continues to specify CRA pipelines over polymer lined pipelines for hydrocarbon service, particularly in sour service. There appear to be two principle concerns for this reluctance to specify polymer lined pipelines for hydrocarbon service. Firstly, corrosive species May be able to permeate through the polymer material and make contact with the host pipe. Secondly, permeated gas may accumulate in an annulus between or within the liner and the host pipe and expand during operational de-pressurisation of the pipeline, causing collapse of the liner.

However, the Applicant has developed a liner which addresses these issues. The improved pipe liner comprises a metallic barrier layer, which prevents permeation through the liner, sandwiched between an inner polymer pipe and an outer polymer pipe. The inner polymer pipe is porous which permits free movement of gas between the internal bore of a lined pipe and the barrier layer, so as to prevent accumulation of gases anywhere in the lined pipe, while ensuring that gases do not permeate to, and damage, the host pipe. This intentional permission of free movement through the inner polymer pipe is not to be confused with the gradual and eventual permeation that occurs, particularly under pressure, in conventional liners or even in conventional barrier pipe. As explained above, such permeation is entirely undesirable and can have catastrophic consequences in service.

The Applicant has realised that conventional methods of joining lined pipes together are incompatible with this improved liner. It is therefore an object of at least one aspect of the present invention to provide a method and/or apparatus for joining lined pipe lengths which comprise the improved liner.

The Applicant has also realised, as intimated above, that there are in any case deficiencies in existing methods and/or apparats for joining conventional lined pipes together. It is therefore also an object of at least one aspect of the present invention to provide an improved or at least alternative method and/or apparatus for joining conventional lined pipe lengths.

Further aims and objects of the invention will become apparent from reading the following description.

SUMMARY OF THE INVENTION

According to a first aspect of the invention there is provided a method of joining lined pipe, the method comprising:
 joining a first fitting to a first pipe;
 joining a second fitting to a second pipe;
 inserting a first end of a fit-up sleeve into the first fitting to force a first liner against the first fitting;
 inserting a second end of the fit-up sleeve into the second fitting to force a second liner against the second fitting; and
 joining the first fitting to the second fitting.

For the avoidance of doubt, the above steps need not be performed in the order listed.

Preferably, the method further comprises inserting the first liner in the first pipe and inserting the second liner in the second pipe. Inserting the liner in the pipe may be performed before or after joining the respective fitting to the pipe.

Preferably, inserting the liner comprises reducing the external diameter of the liner and pulling the liner through the pipe, or both the pipe and respective fitting, before allowing the liner to revert.

Preferably, reducing the diameter of the liner comprises pulling the liner through a swaging die or one or more rollers. Alternatively, reducing the diameter of the liner comprises folding or otherwise deforming the cross-section of the liner.

Optionally, the method comprises trimming the liner back to substantially coincide with an insertion rim of the respective fitting. The end of the liner may therefore be in alignment with the insertion rim or may extend slightly beyond the insertion rim.

Alternatively, the first and second pipes may be lined pipes. For the avoidance of doubt, a lined pipe is a pipe which has already been lined and comprises (at least) a host pipe and a liner, and the fitting is joined to the host pipe.

Preferably, the method comprises causing the liner of each lined pipe to extend into the corresponding fitting. Each liner may be caused to extend into the corresponding fitting by attaching a towing head to the end of the liner and pulling the liner. The towing head May be a mechanical towing head or a solid towing head welded to the liner. Optionally, the method comprises cutting the host pipe prior to joining the fitting to the corresponding host pipe.

Preferably, the internal surfaces of the first and second fittings are provided with a plurality of castellations. Preferably, inserting the fit-up sleeve forces first portions of the first and second liners against corresponding first portions of the castellations.

Prior to inserting the fit-up sleeve, the method preferably comprises inserting first and second sealing rings within the first and second liners to force second portions of the first and second liners against corresponding second portions of the castellations.

Prior to inserting the first and second sealing rings, and optionally prior to joining the first and second fittings to the first and second lined pipes, the method preferably comprises temporarily reducing the outer diameter of the liners.

Optionally, the method comprises inserting insulation between the first and second liners and the corresponding first and second host pipes prior to joining the fittings to the respective pipes. Alternatively, or additionally, the method comprises applying one or more cooling jackets to external surfaces of the first and second host pipes prior to joining the fittings to the respective pipes. One or more cooling jackets may be applied to external surfaces of the fittings before joining the fittings.

Preferably, the method comprises providing an overlap between the first and second liners and the first and second fittings. Most preferably, the first and second liners extend to insertion rims of the first and second fittings. Preferably, the first end of the fit-up sleeve abuts the insertion rim of the first fitting and the second end of the fit-up sleeve abuts the insertion rim of the second fitting.

Optionally, the method comprises providing an o-ring or gasket between the fit-up sleeve and each of the insertion rims. Where present, the method optionally comprises providing an o-ring or gasket between each of the sealing rings and the fit-up sleeve.

Preferably, the method comprises welding the first and second fittings to the first and second host pipes. Preferably, the method comprises welding the first fitting to the second fitting. Alternatively, the method comprises attaching a flange of the first fitting to a flange of the second fitting. Further alternatively, the method comprises inserting a pin section of one of the first and second fittings into a box section of the other.

Preferably, inserting the second end of the fit-up sleeve into the second fitting to force the second liner against the second fitting comprises moving the first lined pipe towards the second lined pipe after inserting the first end of a fit-up sleeve into the first fitting. Alternatively, inserting the first end of the fit-up sleeve into the first fitting to force the first liner against the first fitting comprises moving the first lined pipe towards the second lined pipe after inserting the second end of the fit-up sleeve into the second fitting.

In the case of a mechanical connection, moving the first lined pipe towards the second lined pipe may comprise making the mechanical connection. Making the mechanical connection may comprise tightening of one or more bolts or application of one or more clamps.

Optionally, the method comprises forming a plurality of castellations in internal surfaces of the first and second fittings. Optionally, the plurality of castellations are formed in a corrosive resistant alloy cladding applied to the first and second fittings. Alternatively, the plurality of castellations are formed in the body of the first and second fittings.

Optionally, the liner of each lined pipe comprises an inner polymer pipe and a barrier layer surrounding the inner polymer pipe, wherein the inner polymer pipe is porous. Preferably, the liner of each lined pipe further comprises an outer polymer pipe surrounding the barrier layer. Preferably, the outer polymer pipe is non-porous.

Where present, and where applicable, preferably the sealing rings compress the liners sufficiently to render the inner polymer layers non-porous.

Optionally, the method comprises removing a section of the porous layer. Preferably, the porous layers terminate at the edge or ends of the sealing rings. Alternatively, the porous layers terminate behind the sealing rings. Optionally, the porous layer is removed by chemically dissolving the material of the porous layer. Alternatively, the porous layer is removed by cutting or peeling. Optionally, the method comprises reducing the effectiveness of an adhesive layer between the porous layer and the barrier layer to aid in removal. Alternatively, the adhesive between the porous layer and the barrier layer, at least in the region to be removed, is selected or adapted to enable the inner porous layer to be peeled or otherwise removed from the barrier layer.

Preferably, the method comprises carrying out non-destructive testing of a welded pipe joint. Preferably, the method comprises re-making the welded pipe joint responsive to determining that the pipe joint comprises an unacceptable weld.

Preferably, re-making the pipe joint comprises:
cutting through the pipe joint;
separating the first fitting from the second fitting;
removing the fit-up sleeve;
inserting a first end of a replacement fit-up sleeve into the first fitting to force the first liner against the first fitting;
inserting a second end of the fit-up sleeve into the second fitting to force the second liner against the second fitting; and
welding the first fitting to the second fitting.

Optionally, cutting through the pipe joint comprises cutting through the fit-up sleeve, and removing the fit-up sleeve comprises removing portions of the fit up sleeve from the first and second fittings.

Preferably, cutting through the pipe joint and separating the first fitting from the second fitting comprises cutting out a section of the pipe joint containing the weld. Preferably, the section is of a predetermined length. Preferably, the replacement fit-up sleeve is shorter than the removed fit-up sleeve by the predetermined length.

Alternatively, re-making the pipe joint comprises:
cutting through the pipe joint;
separating the first fitting from the second fitting;
removing the fit-up sleeve;
removing a first spacer ring from each of the first and second fittings;
inserting a second spacer ring in each of the first and second fittings;
re-inserting the fit-up sleeve into the first fitting to force the first liner against the first fitting;
re-inserting the second end of the fit-up sleeve into the second fitting to force the second liner against the second fitting; and
welding the first fitting to the second fitting.

Preferably, cutting through the pipe joint and separating the first fitting from the second fitting comprises cutting out a section of the pipe joint containing the weld. Preferably, the section is of a predetermined length. Preferably, the second spacer rings are shorter than the first spacer rings by a length corresponding to the predetermined length (or size of the weld cut-out), or vice versa.

Embodiments of the first aspect of the invention may comprise features corresponding to the preferred or optional features of any other aspect of the invention (or vice versa).

According to a second aspect of the invention, there is provided a pipeline comprising:
a first lined pipe and a second lined pipe;
a first fitting joined to the first lined pipe and a second fitting joined to the second lined pipe, the first fitting joined to the second fitting; and
a fit-up sleeve;
wherein the liner of the first lined pipe extends into the first fitting and the liner of the second lined pipe extends into the second fitting; and
wherein a first end of the fit-up sleeve forces the first liner against the first fitting and a second end of the fit-up sleeve forces the second liner against the second fitting.

As noted above in relation to the first aspect, a lined pipe comprises (at least) a host pipe and a liner, and the fitting is joined to the host pipe.

Preferably, the internal surfaces of the first and second fittings comprise a plurality of castellations. Preferably, the plurality of castellations are formed in a corrosive resistant alloy cladding applied to the first and second fittings. Alternatively, the plurality of castellations are formed in the body of the first and second fittings.

Preferably the castellations project from the internal surfaces of the fittings. Alternatively, or additionally, the internal surfaces of the fittings comprise a series of grooves. The series of grooves inevitably result in castellated surfaces.

Preferably, the fit-up sleeve forces first portions of the first and second liners against corresponding first portions or sets of the castellations. Preferably, the first portions or sets of the castellations comprise a tapered inner diameter.

Preferably, the pipeline further comprises first and second sealing rings within the first and second liners which force second portions or sets of the first and second liners against corresponding second portions or sets of the castellations. Optionally, the second portions or sets of the castellations comprise a constant inner diameter. Alternatively, the first and second portions or sets of the castellations comprise a continuous taper.

Optionally, the first and second portions or sets of castellations are continuous. Alternatively, the first and second portions or sets of castellations are axially separated.

Preferably, the fit-up sleeve comprises a substantially cylindrical central portion and first and second liner engaging portions. Preferably, the first and second liner engaging portions are tapered. Preferably, the outer diameter of the cylindrical central portion is greater than the outer diameter of each of the first and second liner engaging portions. In this way, the fit-up sleeve is provided with first and second shoulders.

Optionally, the pipeline further comprises insulation between the first and second liners and the corresponding first and second host pipes at the locations of the joints between the liners and the pipes.

Preferably, the first and second fittings comprise insertion rims. Preferably, the ends of the liners substantially coincide with the insertion rims. Preferably, a first shoulder of the fit-up sleeve abuts the insertion rim of the first fitting and a second shoulder of the fit-up sleeve abuts the insertion rim of the second fitting.

Optionally, the pipeline further comprises an o-ring or gasket between the fit-up sleeve and each of the insertion rims, preferably between the shoulders and respective insertion rims. Where present, the pipeline further comprises an o-ring or gasket between each of the sealing rings and the fit-up sleeve. Alternatively, the fit-up sleeve comprises the sealing rings.

Optionally, the pipeline further comprises a spacer ring between the fit-up sleeve and each of the insertion rims, preferably between the shoulders and respective insertion rims.

Preferably, the first and second fittings are welded to the first and second host pipes. Preferably, the first fitting is welded to the second fitting. Alternatively, the first and second fittings each comprise a flange and the flanges are joined together. Further alternatively, the first fitting comprises a pin section and the second fitting comprises a box section, or vice versa.

Optionally, the liners comprise an inner polymer pipe and a barrier layer surrounding the inner polymer pipe, wherein the inner polymer pipe is porous. Preferably, the liners further comprise an outer polymer pipe surrounding the barrier layer. Preferably, the outer polymer pipe is non-porous.

Where present, and where applicable, preferably the sealing rings compress the liners sufficiently to render the inner polymer layer non-porous.

Optionally, the porous layers of each liner terminate at the edge or ends of the sealing rings, or the porous layers terminate behind the sealing rings, such that the first and second liner-engaging portions of the fit-up sleeve contact the barrier layer.

Embodiments of the second aspect of the invention may comprise features corresponding to the preferred or optional features of any other aspect of the invention (or vice versa).

According to a third aspect of the invention, there is provided a method of producing a pipeline, the method comprising providing a plurality of lined pipes and joining the lined pipes in accordance with the method of the first aspect.

Embodiments of the third aspect of the invention may comprise features corresponding to the preferred or optional features of any other aspect of the invention (or vice versa).

According to a fourth aspect of the invention, there is provided a method of joining lined pipe, the method comprising:
joining a first fitting to a first lined pipe; and
inserting a first end of a fit-up sleeve into the first fitting to force the first liner against the first fitting.
Optionally, the method further comprises:
joining a second fitting to a second lined pipe;
inserting a second end of the fit-up sleeve into the second fitting to force the second liner against the second fitting.
Optionally, the method further comprises:
joining the first fitting to the second fitting.
Optionally, the method further comprises inserting a spacer ring into each of the first and second fittings prior to inserting the fit-up sleeve.

Embodiments of the fourth aspect of the invention may comprise features corresponding to the preferred or optional features of any other aspect of the invention (or vice versa), and particularly the first aspect.

According to a fifth aspect of the invention, there is provided a fit-up sleeve comprising;
a tubular body;
the tubular body comprising a substantially cylindrical central portion and first and second tapered liner engaging portions.
Preferably, the outer diameter of the cylindrical central portion is greater than the outer diameter of each of the first and second tapered liner engaging portions. In this way, the fit-up sleeve is provided with first and second shoulders.

Optionally, the fit-up sleeve comprises a corrosion resistant alloy. Alternatively, the fit-up sleeve comprises carbon steel.

Embodiments of the fifth aspect of the invention may comprise features corresponding to the preferred or optional features of any other aspect of the invention (or vice versa).

According to a sixth aspect of the invention, there is provided a fitting comprising:
a tubular body;
wherein a plurality of castellations are formed on an internal surface of the tubular body.
Preferably, the plurality of castellations are formed in a corrosive resistant alloy cladding. Alternatively, the plurality of castellations are formed in the body of the fitting.
Preferably the castellations project from the internal surfaces of the fitting. Alternatively, or additionally, the internal surface of the fitting comprises a series of grooves. The series of grooves inevitably result in castellated surfaces.

Preferably, the fitting comprises an insertion rim.
Preferably, the fitting is configured for welding to a host pipe and another fitting. Alternatively, the fitting comprises at least one flange. Further alternatively, the fitting comprises a pin section or a box section.

Embodiments of the sixth aspect of the invention may comprise features corresponding to the preferred or optional features of any other aspect of the invention (or vice versa).

According to a seventh aspect of the invention, there is provided a method of lining a host pipe, the method comprising:
temporarily reducing the outer diameter of a liner such that it is less than the internal diameter of the host pipe;
inserting the liner into the host pipe; and allowing the liner to revert towards its original size within the host pipe;
wherein an internal surface of the pipe is provided with a plurality of castellations; and
wherein the liner overlaps the castellations after reversion.
Preferably, the method further comprises inserting a sealing ring within the liner to force a portion of the liner into contact with a corresponding portion of the castellations.
Preferably, the pipe is provided with a plurality of castellations by connecting a fitting to the end of the pipe, the fitting comprising the plurality of castellations on an internal surface. Preferably, the method comprises welding the fitting to the end of the host pipe.

Optionally, the liner comprises an inner polymer pipe and a barrier layer surrounding the inner polymer pipe, wherein the inner polymer pipe is porous. Preferably, the liner further comprises an outer polymer pipe surrounding the barrier layer. Preferably, the outer polymer pipe is non-porous. Optionally, the method further comprises removing a section of the inner polymer pipe to expose the barrier layer.

Preferably, the external diameter of the liner is greater than the internal diameter of the host pipe.

Preferably, the method comprises pulling the liner through a swaging die or one or more rollers. Alternatively, the method comprises folding or otherwise deforming the cross-section of the liner.

Preferably, the method comprises subsequently pulling the liner through the host pipe.

Preferably, the method subsequently comprises releasing pulling tension on the liner.

Embodiments of the seventh aspect of the invention may comprise features corresponding to the preferred or optional features of any other aspect of the invention (or vice versa).

According to an eighth aspect of the invention, there is provided a lined pipe comprising:
a host pipe; and
a liner within the host pipe;
wherein an internal surface of the host pipe comprises a plurality of castellations; and
wherein the liner overlaps at least some of the castellations.
Preferably, the lined pipe comprises a sealing ring which forces a portion of the liner into contact with a corresponding portion of the castellations.
Preferably, the lined pipe comprises a fitting connected to the end of the host pipe, wherein the plurality of castellations are formed on an internal surface of the fitting. Preferably, the fitting is welded to the end of the host pipe.

Optionally, the liner comprises an inner polymer pipe and a barrier layer surrounding the inner polymer pipe, wherein the inner polymer pipe is porous. Preferably, the liner further comprises an outer polymer pipe surrounding the barrier layer. Preferably, the outer polymer pipe is non-porous. Optionally, a section of the inner polymer pipe is removed to expose the barrier layer.

Embodiments of the eighth aspect of the invention may comprise features corresponding to the preferred or optional features of any other aspect of the invention (or vice versa).

According to a ninth aspect of the invention, there is provided a method of producing a pipeline, the method comprising:
 providing a first lined pipe according to the eighth aspect;
 providing a second lined pipe according to the eighth aspect;
 inserting a first end of a fit-up sleeve into the first lined pipe to force a portion of the liner of the first lined pipe into contact with a corresponding portion of the castellations of the first lined pipe;
 inserting a second end of the fit-up sleeve into the second lined pipe to force a portion of the liner of the second lined pipe into contact with a corresponding second portion of the castellations; and
 joining the first lined pipe to the second lined pipe.

Preferably, the first lined pipe is joined to the second lined pipe by welding. Alternatively, the first lined pipe is joined to the second lined pipe by a mechanical connection.

Optionally, the method comprises inserting a first spacer ring into each of the first and second lined pipes prior to inserting the fit-up sleeve.

Optionally, the method further comprises re-making a weld by:
 cutting out the weld;
 separating the first lined pipe from the second lined pipe;
 removing the fit-up sleeve;
 removing the first spacer ring from each of the first and second fittings;
 inserting a second spacer ring in each of the first and second fittings;
 re-inserting the fit-up sleeve into the first lined pipe to force the first liner against the first lined pipe;
 re-inserting the second end of the fit-up sleeve into the second fitting to force the second liner against the second lined pipe; and
 welding the first lined pipe to the second lined pipe.

Preferably, the second spacer rings are shorter than the first spacer rings by a length corresponding to the size of the weld cut-out, or vice versa.

Embodiments of the ninth aspect of the invention may comprise features corresponding to the preferred or optional features of any other aspect of the invention (or vice versa).

According to a tenth aspect of the invention, there is provided a pipe joint comprising:
 a first fitting joined to a first lined pipe and a second fitting joined to a second lined pipe, the first fitting joined to the second fitting; and
 a fit-up sleeve;
 wherein the liner of the first lined pipe extends into the first fitting and the liner of the second lined pipe extends into the second fitting; and
 wherein a first end of the fit-up sleeve forces the first liner against the first fitting and a second end of the fit-up sleeve forces the second liner against the second fitting.

Most preferably, the first fitting is welded to the second fitting.

Embodiments of the tenth aspect of the invention may comprise features corresponding to the preferred or optional features of any other aspect of the invention (or vice versa), and particularly the second aspect.

According to an eleventh aspect of the invention, there is provided a method of re-making a welded pipe joint, such as a welded pipe joint according to the tenth aspect, the method comprising:
 cutting through the pipe joint;
 separating the first fitting from the second fitting;
 removing the fit-up sleeve;
 inserting a first end of the fit-up sleeve or a replacement fit-up sleeve into the first fitting to force the first liner against the first fitting;
 inserting a second end of the fit-up sleeve into the second fitting to force the second liner against the second fitting; and
 welding the first fitting to the second fitting.

Optionally, cutting through the pipe joint comprises cutting through the fit-up sleeve and removing the fit-up sleeve comprises removing portions of the fit-up sleeve from the first and second fittings.

Preferably, cutting through the pipe joint and separating the first fitting from the second fitting comprises cutting out a section of the pipe joint containing the weld. Preferably, the section is of a predetermined length. Preferably, the replacement fit-up sleeve is shorter 13 than the removed fit-up sleeve by the predetermined length.

Alternatively, the method comprises:
 removing a first spacer ring from each of the first and second fittings after removing the fit-up sleeve;
 inserting a second spacer ring in each of the first and second fittings prior to inserting the fit-up sleeve.

Preferably, the second spacer rings are shorter than the first spacer rings by a length corresponding to the size of the weld cut-out, or vice versa.

The method of re-making the pipe joint may be performed subsequent to carrying out non-destructive testing of the welded pipe joint, and may be performed responsive to determining that the pipe joint comprises an unacceptable weld.

Embodiments of the eleventh aspect of the invention may comprise features corresponding to the preferred or optional features of any other aspect of the invention (or vice versa), and particularly the first aspect.

BRIEF DESCRIPTION OF THE DRAWINGS

There will now be described, by way of example only, embodiments of aspects of the invention with reference to the drawings (like reference numerals being used to denote like features, whether expressly mentioned in the detailed description below or not), of which:

FIG. 1 shows a partial cross-section through a lined carbon steel pipe;

FIG. 2 shows a partial cross-section through the lined carbon steel pipe shown in FIG. 1, identifying target lengths and intended locations of welds;

FIG. 3 shows a partial cross-section through the lined carbon steel pipe after a first cut;

FIG. 4 shows a partial cross-section through the lined carbon steel pipe after connection of a mechanical towing head to the liner;

FIG. 5 shows a partial cross-section through the lined carbon steel pipe after tensioning the mechanical towing head and pulling the liner away from the pipe;

FIG. 6 shows a partial cross-section through the lined carbon steel pipe following a second cut and subsequent insertion of an insulation sleeve;

FIG. 7 shows a partial cross-section through the lined carbon steel pipe following attachment of a corrosion resistant alloy clad fitting to the end of the host pipe;

FIG. 8 shows a partial cross-section through the lined carbon steel pipe following release of pulling tension, removal of the mechanical towing head, and insertion of a sealing ring;

FIG. 9 shows a partial cross-section through the lined carbon steel pipe following removal of excess liner;

FIG. 10 shows a partial cross-section through the lined carbon steel pipe following insertion of a fit-up sleeve;

FIG. 11 shows a partial cross-section through the lined carbon steel pipe and another lined carbon steel pipe to which it is being joined;

FIG. 12 shows a partial cross-section through the joined lined carbon steel pipes;

FIG. 24 shows a partial cross-section through two lined carbon steel pipes prior to joining together, in accordance with another embodiment of the invention.

Figure 1:
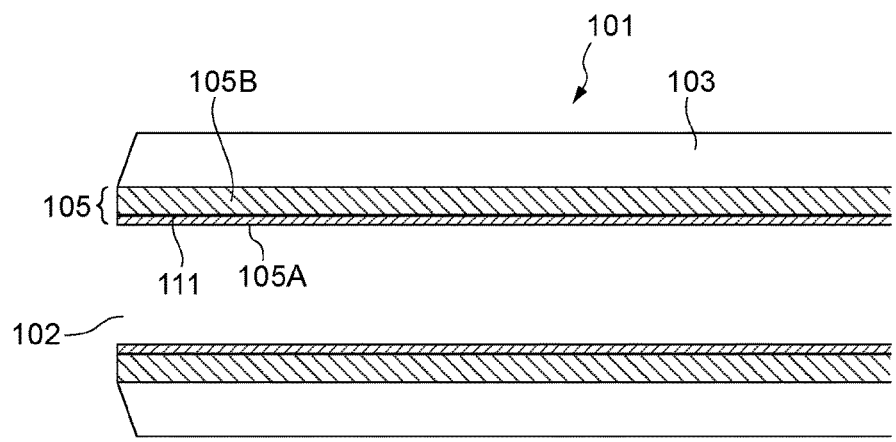
FIGS. 1 to 12 illustrate various steps of a method of joining two lined pipes together in accordance with the invention, and in particular.

Unless stated otherwise, features in the drawings are not to scale. Scales are exaggerated in order to better illustrate the features of the invention and the problems which the invention are intended to address.

DETAILED DESCRIPTION OF PREFERRED EMBODIMENTS

In the examples which follow, embodiments of the invention are described in the context of the Applicant's above-mentioned improved (multilayer polymetal) pipe liner, for which it finds particular utility, but it will be understood that the methods and/or apparatus described are equally applicable to conventionally lined pipes, such as polyethylene lined water injection flowlines and the like.

Furthermore, although the preferred technique for installation of pipe liners is the reduction (via a swaging die), insertion and reversion technique developed by British Gas and subsequently refined for the oil and gas industry by Swagelining Limited, it will be appreciated that the invention is not limited to nor by any particular method by which the pipe has been lined. For example, it is known that instead of pulling a liner through a reduction die it may be pulled through one or more reduction rollers (sometimes termed "roll-down"). Such a technique is employed in the Tite Liner® system developed by United Pipeline Systems.

Alternatively, the liner may be folded or otherwise deformed into an H-, U- or C-shaped cross-section, inserted into the host pipe, and then allowed or caused to return to its original shape by application of heat and/or pressure for example. This is sometimes referred to as close-fit lining or fold and form lining.

Improved Pipe Liner

FIG. 1 shows a cross-section through a lined pipe 101 which comprises a carbon steel host pipe 103 and a liner 105. As explained in the background to the invention above, a carbon steel host pipe may be provided with corrosion resistance by installation of a polymer liner (using a reduction and reversion process) which remains in tight contact with the interior surface of the carbon steel host pipe. For the avoidance of doubt, the internal bore of the lined pipe through which fluid is transported is indicated by reference numeral 102.

The liner 105 differs from conventional liners in at least one key detail. The liner 105 is a multilayer liner and comprises an outer polymer layer, polymer pipe 105B, which is bonded to barrier layer 111 using an adhesive (not shown). It is the outer polymer pipe 105B which contacts the host pipe 103 after the liner 105 has reverted. It will be understood that the outer polymer pipe is substantially cylindrical, hence describing same as a "pipe". It might equivalently be termed an outermost polymer layer of the liner.

The multilayer liner further comprises an inner polymer pipe 105A which is porous, and is bonded to the barrier layer 111, on the opposite side of the barrier layer 111 from the outer polymer pipe 105B, using a (preferably porous) adhesive (again, not shown). It will again be understood that the porous pipe 105A is also substantially cylindrical, hence describing same as a "pipe". Likewise, it might equivalently be termed an innermost polymer layer of the liner.

For the avoidance of doubt, the purpose of the porous pipe 105A is expressly to permit the passage of gas (or liquid) through the inner layer (or layers) of the liner 105, between the internal bore 102 of the lined pipe 101 and the barrier layer 111 and vice versa. The porous pipe 105A comprises a polymer material and purposely has a plurality of pores or interstices which permit the passage of gas (or liquid), in contrast with conventional polymer liners which are substantially solid (i.e. do not permit the passage of gas or liquid). While gas or liquid, particularly under pressure, might gradually and eventually permeate through a conventional liner, the skilled person will realise that this is not at all desirable and is potentially catastrophic.

The liner 105 prevents permeation and furthermore does so without moving the risk from an annulus between a liner and a host pipe to an interface between a barrier layer and an inner polymer pipe (for example, of a barrier pipe). By preventing permeation in a way that does not compromise the integrity of the pipeline, corrosive attack on a carbon steel host pipe can be reliably prevented. It follows that the necessity for CRA materials will be significantly reduced because the carbon steel host pipe is no longer being exposed to corrosive products in service. This will result in a significant reduction in the total cost as well as in the environmental impact of such pipelines. Even if the barrier layer comprises a CRA material, this would still represent a significant reduction in CRA material overall because a CRA barrier layer would contain only a small fraction of the amount of CRA that would be used to line or clad the same length of pipe.

It will now be described how such lined pipes can be joined.

Joining Lined Pipes

As discussed above, it is preferred that the pipes to be joined have been (or will be, as discussed below) lined using a reduction and reversion process, such as Swagelining® or roll-down. It will however be understood that other methods of lining a pipe with such a liner are possible (as intimated above with examples). The following description of a process of joining sections of lined pipe in a "cut to length" operation allows certain preferred and optional features of the methods and apparatus to be understood in context. Note that these methods are applicable whether the liner is a single layer liner or multilayer liner, and/or whether or not the multilayer liner comprises a porous inner pipe or a barrier layer. It is also discussed below how certain steps may be omitted in different operations; a "cut to length" operation being one specific operation which comprises steps not necessary in other operations (as will become clear).

Figure 2:
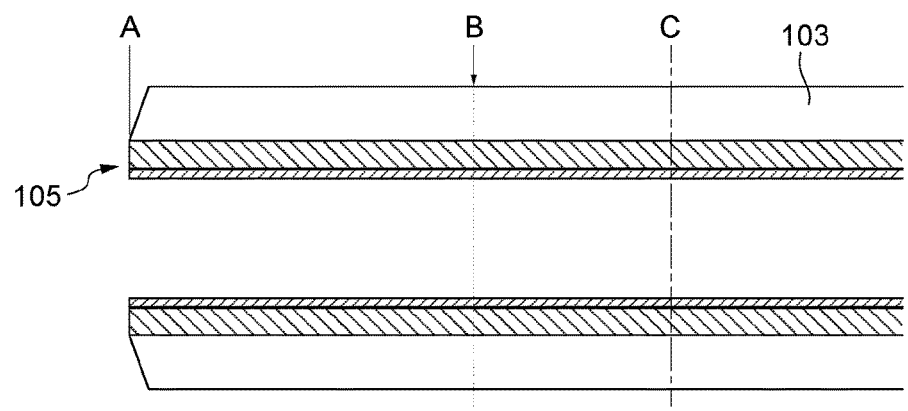
Figure 3:
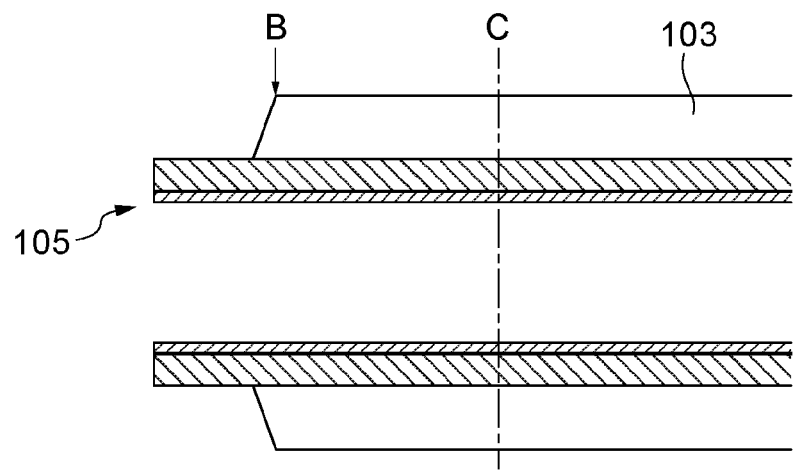

FIG. 2 indicates at A the extent of the fabricated and lined length of the pipe 101, at B the measured length for tie in weld termination, and at C the intended location of the connection between the pipe 101 and associated fitting (not shown but indicated by reference numeral 151 in subsequent Figures). FIG. 3 shows the pipe 101 following a first cut through the host pipe 103 to the liner 105, and a rough cut of the liner 105 leaving a relatively short (for example 500 mm) length of liner 105 protruding from the host pipe 103.

Figure 4:
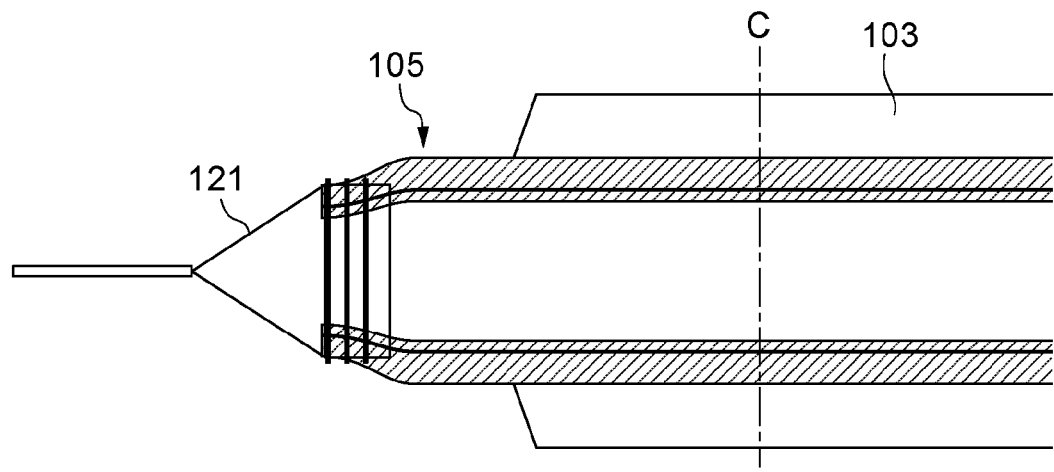
Figure 5:
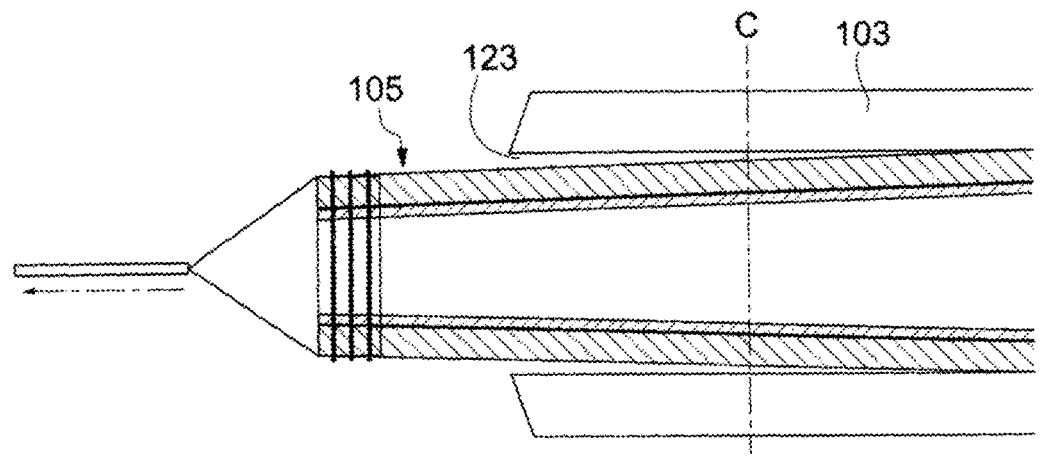

Following removal of the host pipe section and exposing the liner 105, a mechanical towing head 121 is attached to the end of the liner 105 as shown in FIG. 4. The towing head 121 is then tensioned which extends the liner 105 axially and consequently results in a reduction in the outer diameter of the liner 105, thus producing an annular space 123 between the liner 105 and the host pipe 103 as shown in FIG. 5. The host pipe 103 is then cut to the target length C as shown in FIG. 6 and an insulation sleeve 125 is inserted into the annular space 123.

Figure 6:
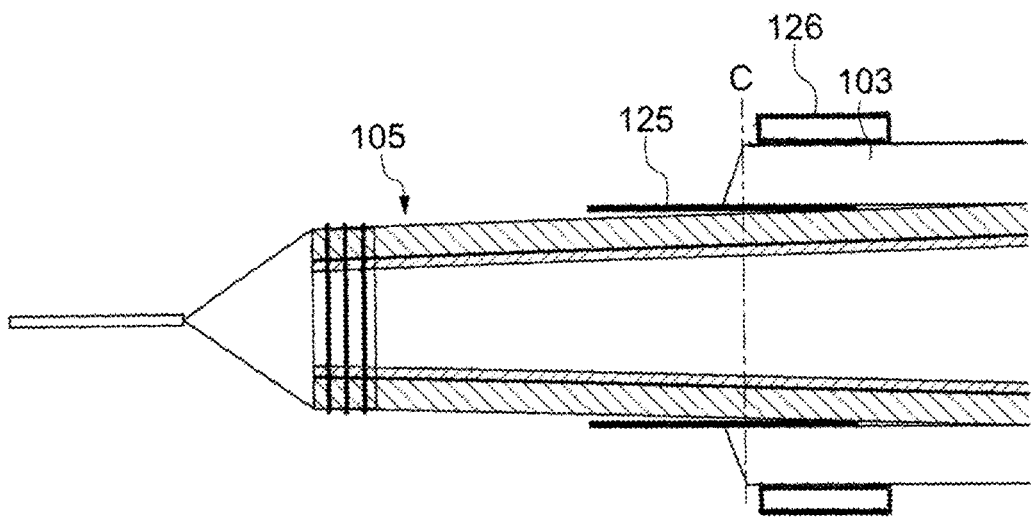

It is anticipated that instead of carrying out two separate cuts of the host pipe 103 (as shown in FIG. 3 and FIG. 6, respectively) a single cut, for example to location C, could be made without first making a cut to location B, particularly if the liner 105 is not expected to move when the host pipe is cut 103 (if there is a high level of residual strain the liner might expand). Alternatively, the pipe 101 could instead be provided with a portion of the liner 105 already protruding beyond the end of the host pipe 103, for example by lining the pipe 101 with an oversized liner 105 or by cutting the host pipe 103 in an earlier preparatory step, ready for attachment of the mechanical towing head 121 and subsequent joining steps as follow.

Figure 7:
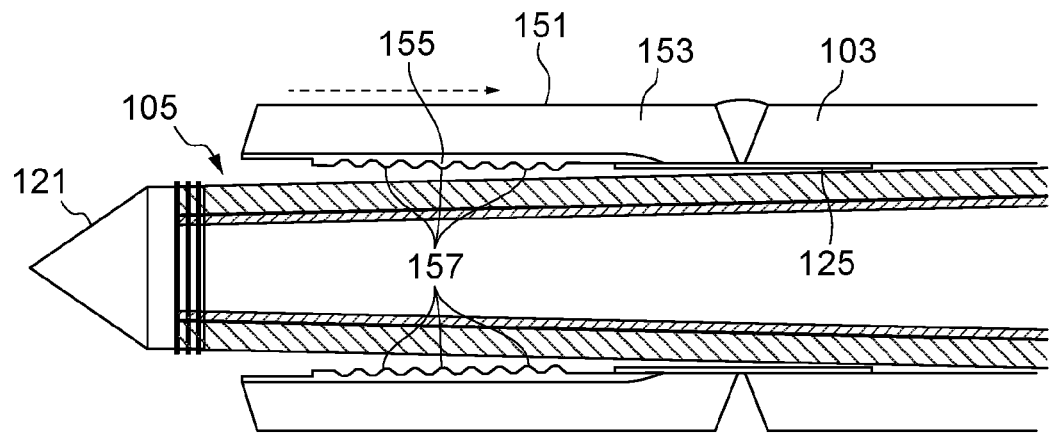

Tubular fitting 151, which comprises a carbon steel body 153 with an internal corrosion resistant alloy cladding 155, is positioned over the liner 105 and welded to the host pipe 103 using an annular girth weld as shown in FIG. 7. The insulation sleeve 125 previously inserted between the liner 105 and the host pipe 103 protects the liner 105 during this step. Of course, the insulation sleeve 125 might be omitted if sufficient space can be provided between the liner 105 and the host pipe 103 or if the welding process can otherwise avoid heat damage to the liner 105. The insulation sleeve 125 could be removed after the welding step is carried out, but in this example it remains in place post-welding. It is also anticipated that instead of (or in addition to) inserting the insulation sleeve, active cooling might be employed. For example, cooling jackets 126, as shown in FIG. 6, may be wrapped around the host pipe in the vicinity of the weld to actively draw heat away and prevent damage to the liner.

Note that the fitting 151 might alternatively be referred to as an extension or a pipe extension as it effectively extends the host pipe 103 as well as providing it with castellations (as described below). Also note that the fitting might be comprised entirely of corrosion resistant alloy or carbon steel.

The inner surface of the fitting 151 is provided with a series of projections or castellations 157, further details of which will be discussed below. After the welding step is carried out, the mechanical towing head 121 is removed and the liner 105 begins to revert to its original (pre-tensioned) size and length, whereupon it comes into contact with the inner surface of the fitting 151 and hence the castellations 157, which the liner 105 overlaps.

Note that the castellations 157 define a series of corresponding grooves and as such the inner surface of the fitting 151 might, alternatively, be described as being provided with a series of grooves. In fact, instead of directly providing castellations (which project out from the inner surface of the fitting) the inner surface of the fitting might be provided with a series of grooves in the inner surface of the fitting which inevitably results in a castellated surface. It is preferred however that the castellations project from the internal diameter of the fitting.

In this embodiment, the castellations 157 comprise a first castellation section 157A and a second castellation section 157B. The first castellation section 157A has a substantially constant inner diameter whereas the second castellation section 157B tapers outwardly towards the distal end of the fitting 151 (with respect to the host pipe 103) from an inner diameter similar or corresponding to that of the first castellation section 157A to a larger inner diameter closer to the inner diameter of the body 153 of the fitting 151.

Figure 8:
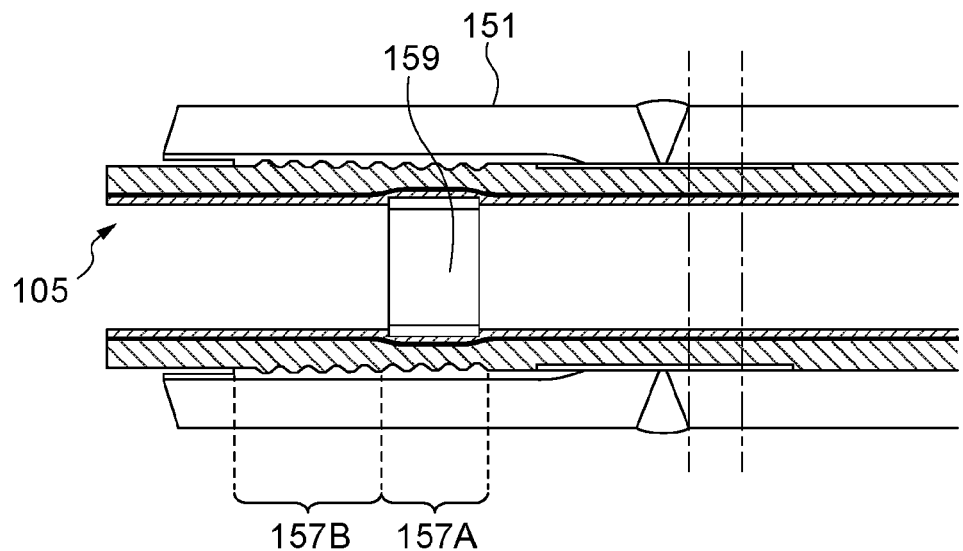

As shown in FIG. 8, a sealing ring 159 is inserted into the fitting 151, within the liner 105, which forces the liner 105 into contact with the first castellation section 157A. This serves to prevent subsequent movement of the liner 105 (should it be required) and provides a first seal. Note that the sealing ring 159 compresses all layers of the liner 105, including the porous layer which is compressed sufficiently to render it non-porous. The sealing ring 159 is formed from a corrosion resistant alloy but might be formed from a different material such as carbon steel with a corrosion-resistant coating It is envisaged that the castellations might comprise a single section which is tapered in its entirety. That is, there is no section of constant inner diameter. To provide a similar effect to the substantially constant inner diameter section 157A, the gradient of the single taper may increase towards the distal end of the fitting. This may not be necessary, for example if the sealing ring is tapered in the opposite sense.

Figure 9:
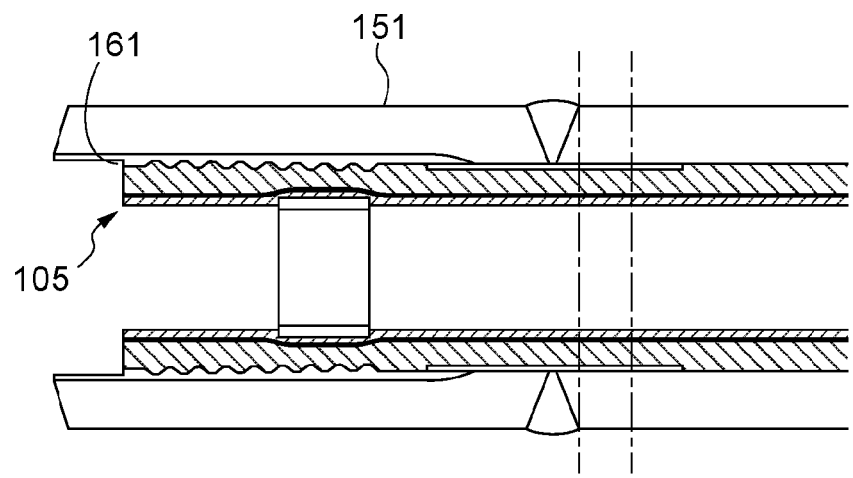

Excess liner is then trimmed back as shown in FIG. 9 such that the liner 105 terminates short of the ends of the fitting 151, in alignment with an insertion rim 161 (or extending slightly beyond), in this case provided by the internal corrosion resistant alloy cladding 155. A fit-up sleeve 163 is then inserted into the end of the liner 105. The fit-up sleeve 163 comprises a first liner engaging portion 165 which is tapered in the opposite sense to the taper of the second castellation section 157B. In this region the fit-up sleeve 163, and in particular the first liner engaging portion 165, forces the liner 105 into the castellations in the second castellation section 157B and provides a second seal.

The fit-up sleeve 163 comprises a central portion 167 which is substantially cylindrical and has an outer diameter larger than that of the first liner engaging portion 165 so as to define a shoulder 168 which abuts the insertion rim 161 of the fitting 151 and creates an airtight seal. Accordingly, the depth to which the fit-up sleeve 163 is inserted can be controlled or pre-determined. The fit-up sleeve 163 is symmetrical and comprises a second liner engaging portion 169, corresponding to the first liner engaging portion 165, at the opposite end of the fit-up sleeve 163.

It is foreseen that o-rings or gaskets can be employed at the interfaces between, for example, the shoulders and the insertion rims, to improve the seals at these locations. O-ring or gasket sizes can be selected from a look up table based on the final dimensions and other parameters of the joint, for example gap sizes and/or the actual depth of the insertion rim following any necessary preparation of the fitting for welding. For example, "j" preparation for automatic welding or "v" preparation for manual welding will result in variability which can be compensated for using appropriately sized o-rings or gaskets.

Like the sealing ring 159, the fit-up sleeve 163 is formed from a corrosion resistant alloy but might likewise be formed from a different material such as carbon steel suitable corrosion protection.

It is envisaged that in some embodiments the sealing ring 159 could be dispensed with and the fit-up sleeve used alone. In such an arrangement, the first and second liner engaging portions of the fit-up sleeve might have the same axial extent as the corresponding castellations. Likewise, the distal ends of the first and second liner engaging portions may comprise a first section of substantially constant outer diameter (at distal ends thereof) and a second section which tapers outwardly from the first section towards the central portion. The first section of substantially constant outer diameter would cooperate with the castellations of substantially constant inner diameter, and the tapered second section would cooperate with the tapered second castellation section.

To join the pipe 101, which we will now refer to as the first pipe, to a second pipe 201, the second pipe 201 is prepared in a similar manner to the first 101 up to but before the point at which the fit-up sleeve 163 is inserted. As such, the liner 205 of the second pipe 201 is forced against a first castellation section 257A of a second fitting 251 by a sealing ring 259, and the liner 205 terminates at a corresponding depth stop or insertion rim 261.

Figure 11:
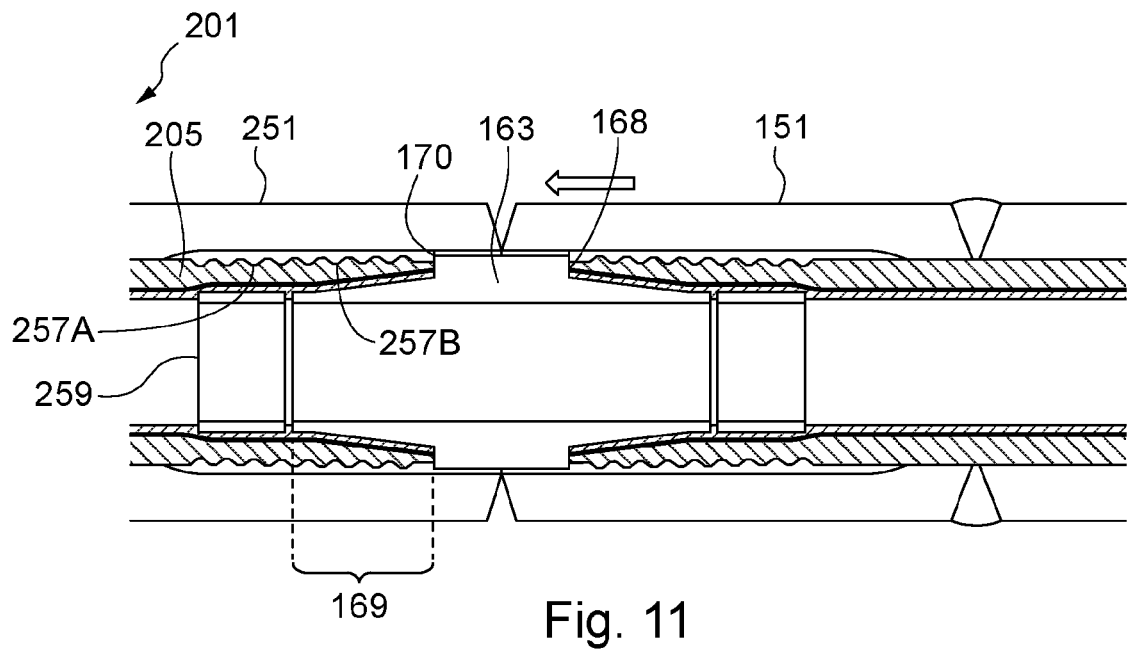

As shown in FIG. 11, the second pipe is stationary and the first pipe 101, terminated by the fitting 151 and fit-up sleeve 163, is pushed or otherwise moved towards the second pipe 201. The fit-up sleeve 163 is received in the second pipe 201 and further movement causes the second liner engaging portion 169 to force the liner 205 into the castellations in the second castellation section 257B. Note that the depth stop or insertion rim 161 of the first fitting 151 acts against the shoulder 168 of the fit-up sleeve 163 as a ram to push the fit-up sleeve 163 into the liner 203. Similarly, opposing shoulder 170 abuts corresponding insertion rim 261 of the second fitting 251, forming another airtight seal.

In addition to providing seals (the implications of which are discussed below) these abutments also prevent the fit-up sleeve from being inserted beyond a target depth (or target depths). A further benefit of the fit-up sleeve 163 is that by having an internal diameter commensurate with the diameter of the bore 102 it can effectively act as a pigging sleeve which facilitates the transit of pigs over the resulting pipe joint.

It will of course be understood that in this scenario the first pipe 101 (terminated by the fitting 151 and fit-up sleeve 163) could be stationary and the second pipe 201 instead pushed or otherwise moved towards the first pipe 101.

Figure 12:
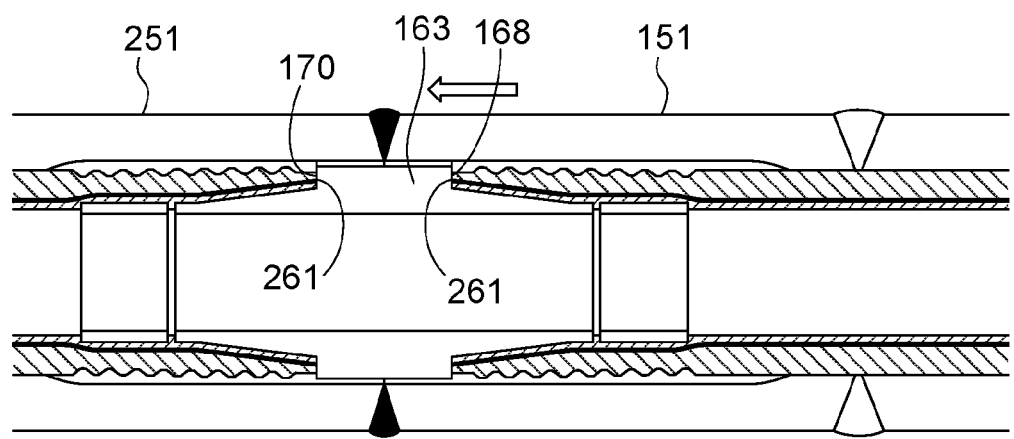

An annular girth weld can then be performed to join the fittings 151, 251 together as shown in FIG. 12. Note that the airtight seals provided at the abutments between insertion rims 161, 261 and shoulders 168, 170 (respectively) prevent backdraughts and provide a boundary for a welding back purge, thus enabling CRA welding (necessitated by the use of a CRA cladding in the fittings 151, 251) without the requirement for purging facilities within the closed pipeline. The relatively small volume of the annular space in the region of the weld (between the abutments) will be filled much more quickly than in normal back purged welding operations.

In an alternative embodiment, discussed briefly below with reference to FIG. 13, the fittings may be wholly formed from carbon steel rather than having CRA cladding. In such an embodiment this necessity for CRA welding and the associated complications (such as back purging) are not a concern. It is envisaged that the fittings might be so formed regardless of whether the pipeline is intended for transporting corrosive species because there may be no risk of said corrosive species reaching the fittings because of a barrier in the liner, the seals formed by the sealing rings and the fit-up sleeve, and/or the seals between the shoulders of the fit-up sleeve and corresponding insertion rims. As mentioned below, there may also be provided o-rings or gaskets to supplement these seals.

Figure 13:
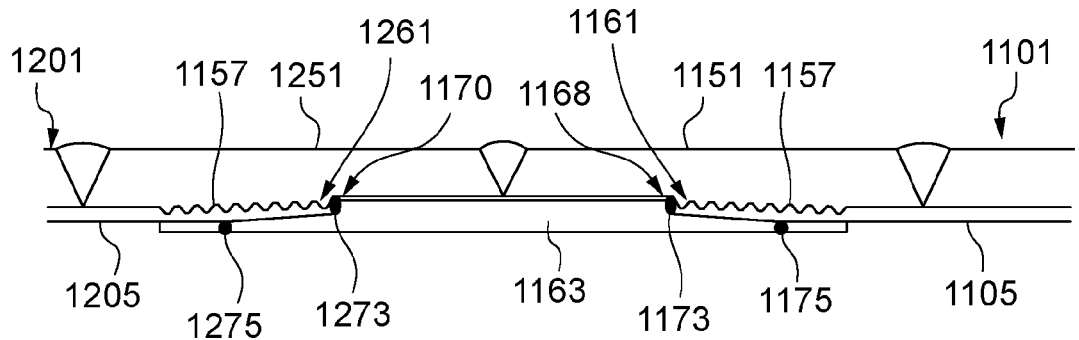
FIG. 13 shows a partial cross-section through lined carbon steel pipes joined using fittings comprised only of carbon steel.

FIG. 13 shows a joint between two lined pipes 1101 and 1201 created in a similar manner to that described above but with some key differences as shall now be described. In this case, the fittings 1151, 1251 are machined from solid oversized carbon steel pipe; that is, there is no internal CRA cladding. Instead, the castellations 1157, 1257 and the insertion rims 1161, 1261 are formed directly in the carbon steel pipe. Of course, the fittings may be formed from any suitable material.

As intimated above, in this embodiment there are provided o-rings 1173 and 1273 between insertion rims 1161, 1261 and shoulders 1168, 1170 (respectively). Of course, the o-rings could be replaced or supplemented with gaskets or the like. O-rings or gaskets may also (or alternatively) be provided between the sealing ring and the fit-up sleeve (as indicated by reference numerals 1175 and 1275) thus providing a further seal.

Also, in this embodiment, the liners 1105, 1205 comprise conventional polyethylene pipe; that is to say there is no barrier layer or porous inner layer. As such, the pipeline illustrated might be deemed unsuitable for, say, sour hydrocarbon service (for which the previous embodiment would be particularly suited) but might be particularly well suited for water injection flowlines.

Figure 14:
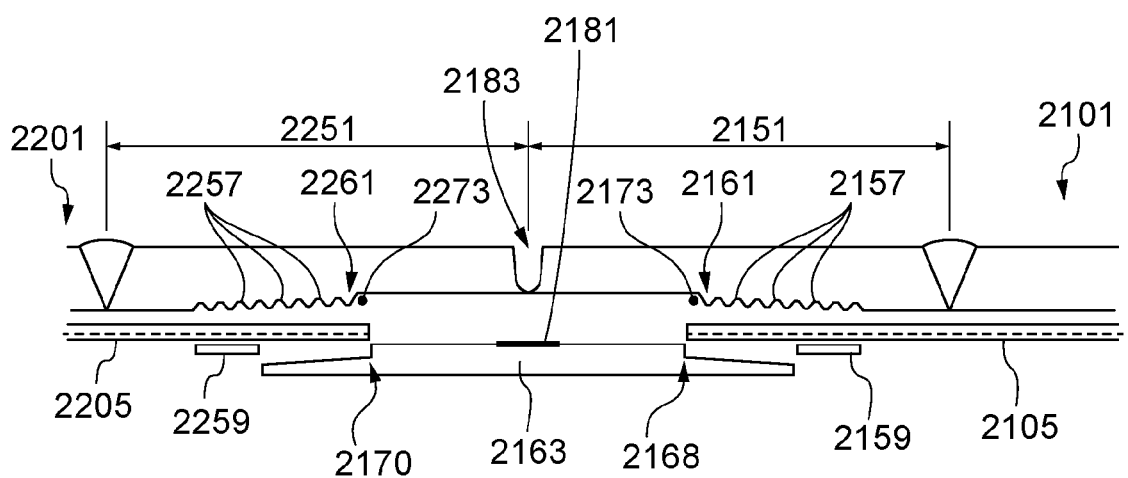
FIG. 14 is an exploded view of the components of an alternative embodiment to that shown in FIG. 13.

FIG. 14 shows an exploded view of a joint between two lined pipes 2101 and 2201, similar to the joint shown in FIG. 13 but again with some key differences as shall now be described. Again, the fittings 2151, 2251 are machined from solid oversized carbon steel pipe. However, the castellations 2157, 2257 are formed directly in the carbon steel pipe by creating a number of recesses.

In this embodiment there are provided o-rings 2173 and 2273 between insertion rims 2161, 2261 and shoulders 2168, 2170 (respectively). However, rather than provide o-rings (or gaskets) between the sealing rings and the fit-up sleeve 2163, the fit-up sleeve 2163 is sized and shaped such that the leading ends of the fit-up sleeve 2163 touch the respective sealing rings 2159, 2259.

There is also provided a copper backing strip 2181 to accommodate automatic welding of the fittings 2151, 2251. To this end, in this embodiment the ends of the fittings are also provided with j-shaped bevels 2183 to accommodate narrow gap welding.

In further contrast with the embodiment shown in FIG. 13, the liners 2105, 2205 comprise a barrier layer and porous inner layer, similar to the liner shown in FIGS. 1 to 12. It is envisaged that the use of such liners will negate the need to use CRA cladding (the fittings in this embodiment comprised solely of carbon steel) even in the presence of very aggressive corrosive species, such as in sour hydrocarbon service. It will however be appreciated from the foregoing that the nature of the liner is irrelevant to the invention.

In other alternative embodiments, not shown, one or more of the welds can be replaced with alternative means of joining tubular components. For example, it is foreseen that instead of carrying out an annular girth weld between fittings, the fittings could be provided with flanges which are instead bolted or otherwise fastened together (see FIG. 24 and brief discussion below). In such an arrangement, the action of bringing the flanges together by the tightening of bolts, application of a clamp (or clamps), or the like might remove the necessity to push the pipes (that is, the fittings on the ends of the pipes) together completely. In other words, the final stages of compressing the liner material between the fit-up sleeve and the castellations is achieved as the flanges are brought together. Also, instead of welding the fittings to the ends of the respective pipes, it is foreseen that the fittings could be attached to the ends of the respective pipes by flanged connections similar to that described briefly above. The fittings could still be welded together (when joining the pipes together) if required or desired.

As an alternative to flanged connections, and hence a further alternative to welding, other mechanical connections may be employed. For example, the inventive arrangements described herein permit connections between lined pipe sections using mechanical connectors not previously deemed suitable for joining lined pipe (certainly not for hydrocarbon service, and especially not sour service).

Mechanical connectors such as GMC Limited's proprietary mechanical connector which forms part of their Intelligently Connected Pipe (ICP™) product for offshore riser and flowline applications, and Oil States Industries' proprietary Merlin™ connection, may be employed to join the fittings together. In such an arrangement, according to a further alternative embodiment of the invention, one of the fittings comprises a pin section and the other fitting comprises a box section to receive the pin section of the other. The box section comprises a plurality of internal grooves and/or projections and the pin section a plurality of corresponding external grooves and/or projections.

When fitting together, the annular space between the pin section and the box section is pressurised (for example by injecting hydraulic fluid) so as to expand the box section. A clamp or a ram pushes (or pulls) the pin section fully into the box section, the pressure is reduced and the box shrinks onto the pin and the grooves and/or projections cooperate to provide a series of metal-to-metal seals. As with the flanged connection described above, the clamping action may provide the final stage of compression between the fit-up sleeve and the respective liner.

As discussed above, it is preferred that the pipes to be joined have been lined using a reduction and reversion process, such as Swagelining® or roll-down, that results in a tight-fitting liner. It will also be understood that other methods of lining a pipe with a liner are possible, and this would include close-fit lining or fold and form lining as described briefly above.

The above described embodiments relate to what may be described as a "cut to length" operation in which an already-lined pipe is joined to another already-lined pipe, and the liner must be manipulated in order to retro-fit the fittings to the host pipes. However, it is foreseen that in many cases instead of attaching the fittings to the ends of pipes that have already been lined, the fittings may be attached to the ends of pipes before the pipes are lined, and the liner then pulled (or inserted) through both the pipe and the fitting and allowed to revert. In such situations, which might in fact represent the most common way in which the invention will be implemented and the benefits realised, FIG. 7 may illustrate the final step of such a process in which the first fitting 151 is welded to the first host pipe 103 before inserting the first liner 105 (i.e. the first pipe 101 is not initially a lined pipe), and the first liner 105 subsequently pulled through the first host pipe 103 and first fitting 151 (for example using a solid pulling head). The second pipe 201, to which the first pipe 101 is to be joined, may also have been lined in this way, that is after the second fitting 251 has been joined to the second host pipe 203 (i.e. the second pipe 201 is not initially a lined pipe either). All the following steps (including but not limited to inserting the sealing ring 159, trimming the liner 105 back to the insertion rim 161, inserting the fit-up sleeve 163 in the first pipe 101, inserting the fit-up sleeve in the second pipe 201 by pushing the first pipe 101 towards the second pipe 201, and joining the first fitting 151 to the second fitting 251) may then be carried out as described above with reference to FIGS. 7 to 12.

It is likely that a joint between lined pipes formed using the latter method (described in the previous paragraph) may be indistinguishable from a joint between lined pipes forms using the "cut to length" method described above with reference to FIGS. 1 to 12.

Alternatively, the ends of the pipes themselves can be machined (or clad in CRA material and machined) to provide the desired internal profile (in which case any features described above in relation to fittings may be provided instead in the pipe; for example castellations, flanges or mechanical connections). Accordingly, it is possible to also omit the steps set out above and discussed with reference to FIGS. 7 (at least), and corresponding steps as they may relate to other embodiments described herein.

Furthermore, the subsequent steps of inserting the sealing ring (FIG. 8) and cutting back the liner to the depth stop or insertion rim (FIG. 9) could constitute the final steps of a lining process which produces a section of lined pipe ready to be joined, as required, to another like section of lined pipe by inserting a first end of a fit-up sleeve into one of the lined pipes, pushing a second end of the fit-up sleeve into the other lined pipe, and then joining the two lined pipes (or their respective fittings) together by welding or by a mechanical connection therebetween as intimated above.

As described above in relation to FIG. 8, the sealing ring is inserted into the fitting within the liner so as to prevent subsequent movement of the liner (should it be required) and to provide a seal which prevents axial transit or permeation of liquid or gas along the porous layer in the region between the sealing ring and the respective fitting. The seal is formed by compressing all layers of the liner, and in particular the porous layer which is compressed sufficiently to render it non-porous. Another seal is provided by the fit-up sleeve which also compresses a subsequent portion of the liner against the fitting and a further seal may be provided by the optional provision of o-rings or gaskets between the fit-up sleeve and the sealing ring (as illustrated in FIG. 13).

In the unlikely event that the porous layer is not sufficiently compressed, for example because the sealing ring is incorrectly sized or incorrectly inserted, there is a slight possibility that liquid or gas may be able to transit or permeate through the porous layer in this region and therefore bypass the sealing ring when in service. It is expected that even in this situation, said liquid or gas would follow the path of least resistance and transit through the uncompressed porous layer at the other side of the sealing ring and re-enter the internal bore of the lined pipe. Nonetheless, it is seen as desirable to mitigate risk and to this end the process described above with reference to FIGS. 1 to 12 (or 7 to 12 as the case may be) may be modified as follows.

Figure 15:
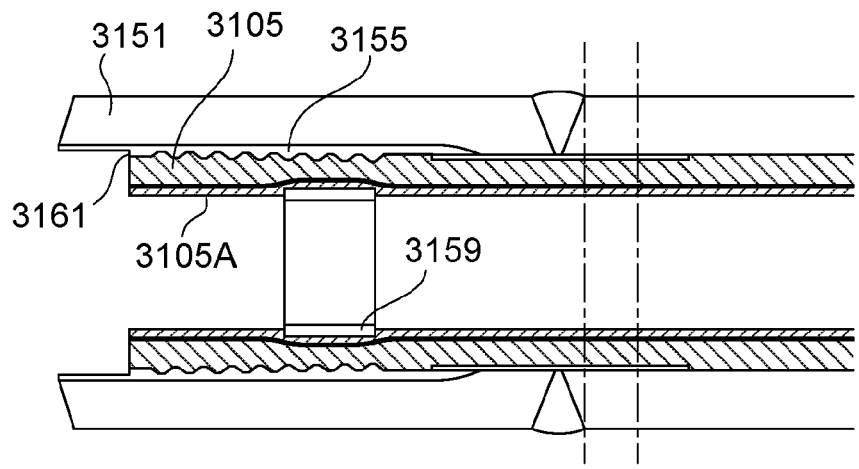
FIG. 15 shows a partial cross-section through a lined carbon steel pipe following removal of excess liner, in an alternative embodiment to that shown in FIG. 9.

FIG. 15 corresponds to FIG. 9 and this embodiment may share any or all features and steps leading up to this point with that embodiment (for example as described with reference to FIGS. 1 to 8). FIG. 15 (similarly to FIG. 9) shows that after insertion of the sealing ring 3159, the liner 3105 is trimmed back such that it terminates short of the ends of the fitting 3151, coincident with (or slightly proud of) an insertion rim 3161 formed by the castellated internal corrosion resistant alloy cladding 3155.

Figure 16:
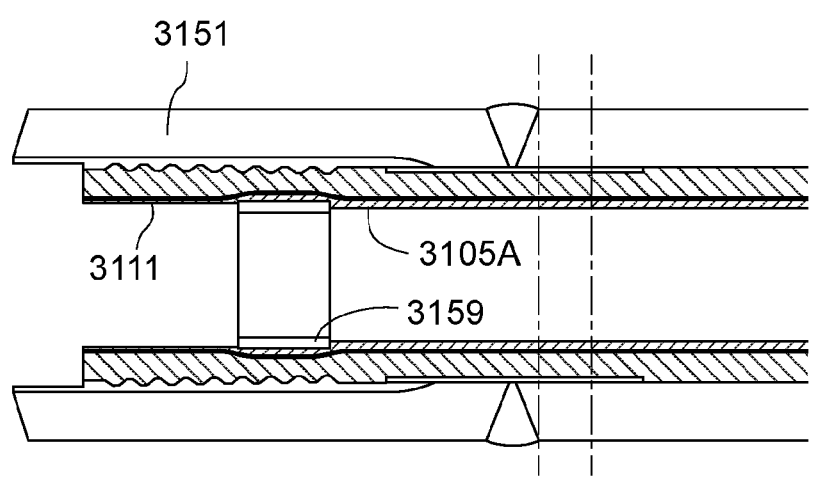
FIG. 16 shows a partial cross-section through the lined carbon steel pipe following removal of a portion of the porous layer.

A section of the porous layer 3105A is then removed such that the porous layer 3105A terminates at the edge or end of the sealing ring 3159 as shown in FIG. 16. The exact process by which the porous layer 3105A is removed will be dependent on the materials from which the liner 3105 is made (for example the material of the porous layer and/or the adhesive between the porous layer and the barrier layer 3111). One way in which the porous layer 3105A may be removed is by chemically dissolving the polymer material of the porous layer 3105A without damaging the barrier layer 3111. Alternatively, the porous layer 3105A may be mechanically removed, for example by cutting or by machining to reduce the thickness of the porous layer 3105A and subsequently peeling it away from the barrier layer 3111. The effectiveness of the adhesive between the porous layer 3105A and the barrier layer 3111 can be reduced, aiding removal of the porous layer 3105A, for example by application of heat or chemical means (such as a suitable acid composition). Alternatively, the adhesive (at least in this region) can be selected to enable the porous layer to be peeled away from the barrier layer.

Figure 10:
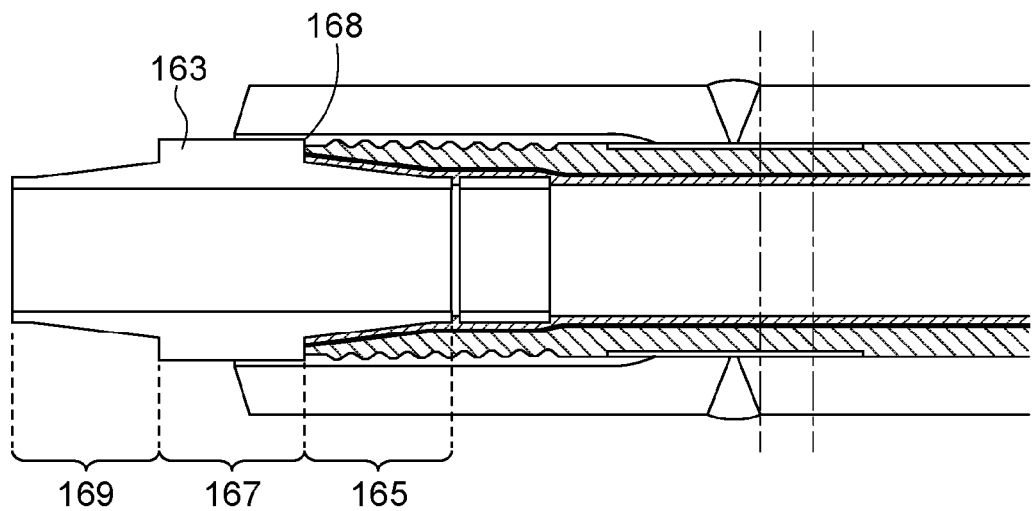
Figure 17:
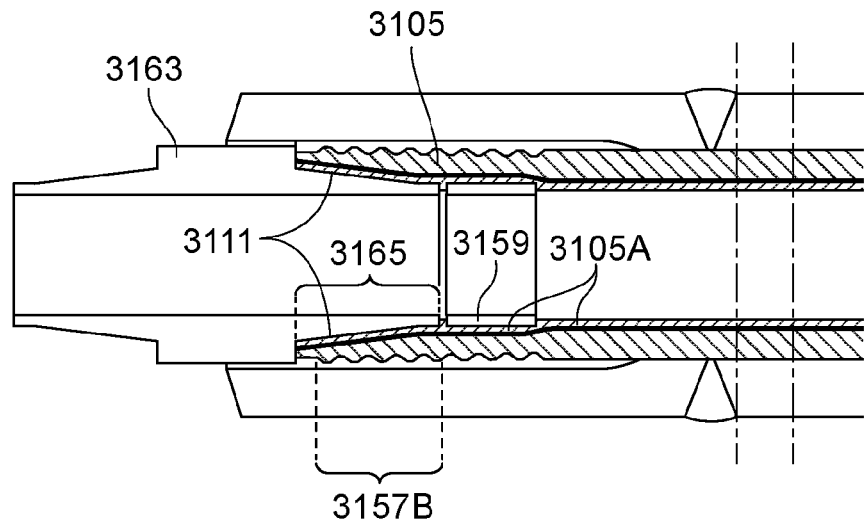
FIG. 17 shows a partial cross-section through the lined carbon steel pipe following insertion of a fit-up sleeve.

Subsequent steps may then correspond to the abovementioned embodiment (for example as described with reference to FIGS. 10 to 12). As shown in FIG. 17 (similarly to FIG. 10) a fit-up sleeve 3163 is then inserted into the end of the liner 3105. The fit-up sleeve 163 comprises a first liner engaging portion 3165 which is tapered in the opposite sense to the taper of the second castellation section 3157B and the liner 3105 is compressed therebetween. In contrast with the abovementioned embodiment, the fit-up sleeve 3163, and in particular the first liner engaging portion 3165, is in direct contact with the now-exposed barrier layer 3111. The absence of the porous layer in this region means that any liquid or gas which transits or permeates past the sealing ring 3159 through the compressed porous layer vents directly back to the internal bore.

Figure 18:
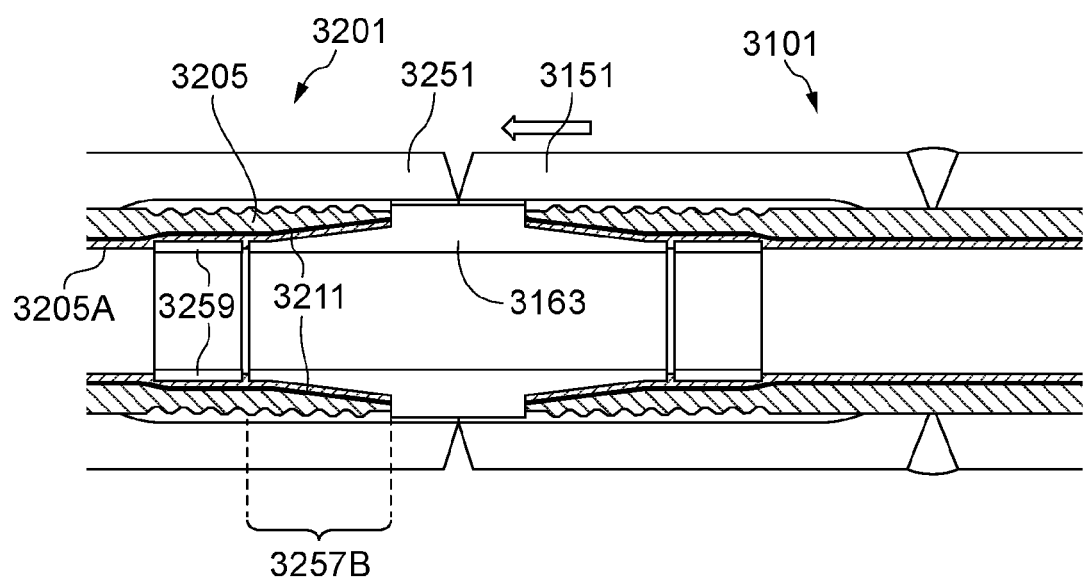
FIG. 18 shows a partial cross-section through the lined carbon steel pipe and another lined carbon steel pipe to which it is being joined.

As shown in FIG. 18 (similarly to FIG. 11), to join the first pipe 3101 to a second pipe 3201, the second pipe 3201 is prepared in a similar manner to the first 3101 up to but before the point at which the fit-up sleeve 3163 is inserted, including removing the porous layer 3205A up to the sealing ring 3259. The first pipe 3101, terminated by the fitting 3151 and fit-up sleeve 3163, is pushed or otherwise moved towards the second pipe 3201. The fit-up sleeve 3163 is received in the second pipe 3201 and further movement causes the liner 3205 to be compressed between second liner engaging portion 3169 and the second castellation section 3257B. Again, in contrast with the abovementioned embodiment, the fit-up sleeve 3163, and in particular the second liner engaging portion 3169, is in direct contact with the now-exposed barrier layer 3211. The absence of the porous layer in this region means that any liquid or gas which transits or permeates past the sealing ring 3259 also vents directly back to the internal bore.

An annular girth weld can then be performed to join the fittings 3151, 3251 together, for example as described above with reference to FIG. 12.

In a variation of the process described above, instead of terminating the porous layer 3105A at the edge of the sealing ring 3159, the porous layer 3105A may be terminated between the ends of the sealing ring such that the interface or termination resides behind the sealing ring 3159 (or between the sealing ring 3159 and the fitting 3151). In this way, the transition between the porous layer 3105A and the barrier layer 3111 may be sealed. This might be achieved by removing a suitable length of the porous layer 3105A prior to insertion of the sealing ring 3159, the sealing ring 3169 effectively extending between a portion of the liner 3105 where there is a porous layer 3105A present and where the barrier layer 3111 is exposed. Alternatively, in another variation of the process described above, the porous layer 3105A may be terminated at a location between the insertion rim 3161 and the sealing ring 3159 such that it resides behind the fit-up sleeve 3163 (or between the first liner engaging portion 3165 of the fit up sleeve 3163 and the fitting 3151).

An additional benefit of the invention, which overcomes significant disadvantages of prior art methods of joining lined pipe, is also realised when it is necessary to repair, or specifically re-make, the weld between the fittings. Conventionally, non-destructive testing is carried out on a weld to make sure it is acceptable for service. If it is not acceptable, but it can be repaired, then a repair is carried out and non-destructive testing carried out to make sure the repaired weld is acceptable for service. If the original or the repaired weld cannot be repaired, it is necessary to re-make the weld. Remaking welds with all existing weldable connectors is time consuming on the critical path and thereby significantly 11 expensive and contains reasonable operational technical risk. The present invention negates the risk and the time taken to effect the re-weld and thereby significantly reduces the cost.

To re-make a welded pipe joint the pipe joint may be cut through, the first and second fittings pulled apart and the fit-up sleeve removed. The skilled person will understand that in order to re-make the weld, it would be usual to cut out a section of the joint containing the weld. This might, for example, be a 30 mm section. In this case it would not be possible to use the same fit up sleeve when re-making the joint because the ends of the fittings would not meet;

accordingly a shorter fit up sleeve (for example, 30 mm shorter), would be required to ensure proper fit up is maintained when the fittings are brought together and welded.

If cutting through the pipe joint also cuts through the fit-up sleeve, the resulting portions of the fit-up sleeve can be removed separately from the first and second fittings. But in general, only the fittings will be cut and the fit-up sleeve can be removed whole. It is foreseen that this fit-up sleeve could be re-used in another joint.

FIGS. 19 to 23 illustrate a further alternative embodiment which incorporates a number of features specifically intended to facilitate repairing or re-making welds between the first and second fittings of the invention. Fit-up sleeves of various embodiments described above comprise a substantially cylindrical central portion of an outer diameter larger than that of the substantially conical liner engaging portions at either end thereof, providing shoulders which abut corresponding insertion rims of the fittings into which they are inserted. As intimated above, in this way the depth to which the fit-up sleeve is inserted can be controlled or pre-determined.

Figure 19A:
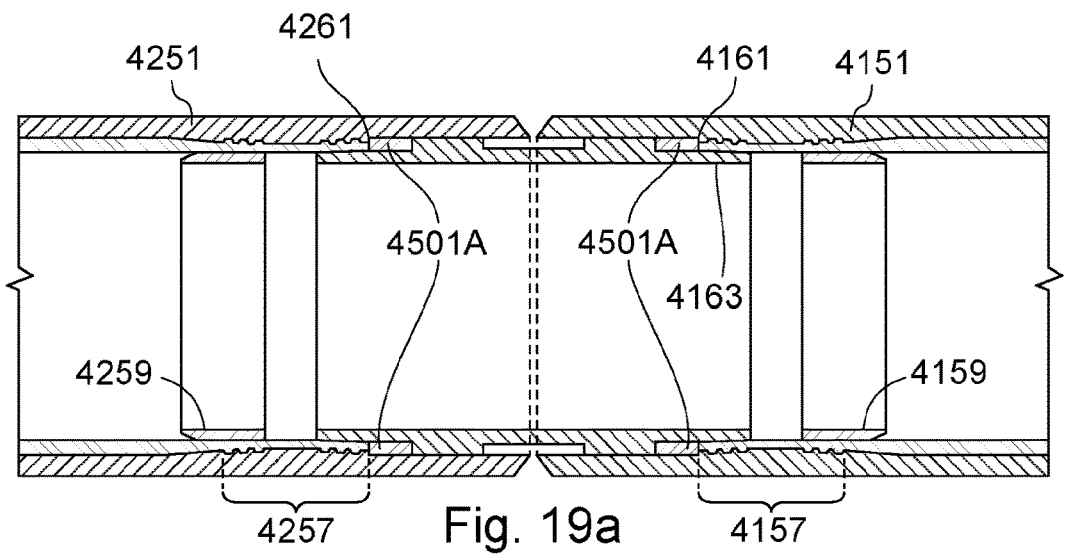
FIG. 19 shows a partial cross-section through two lined carbon steel pipes prior to (a) an initial weld, (b) a first repair weld and (c) a second repair weld, in accordance with another embodiment of the invention.
Figure 19B:
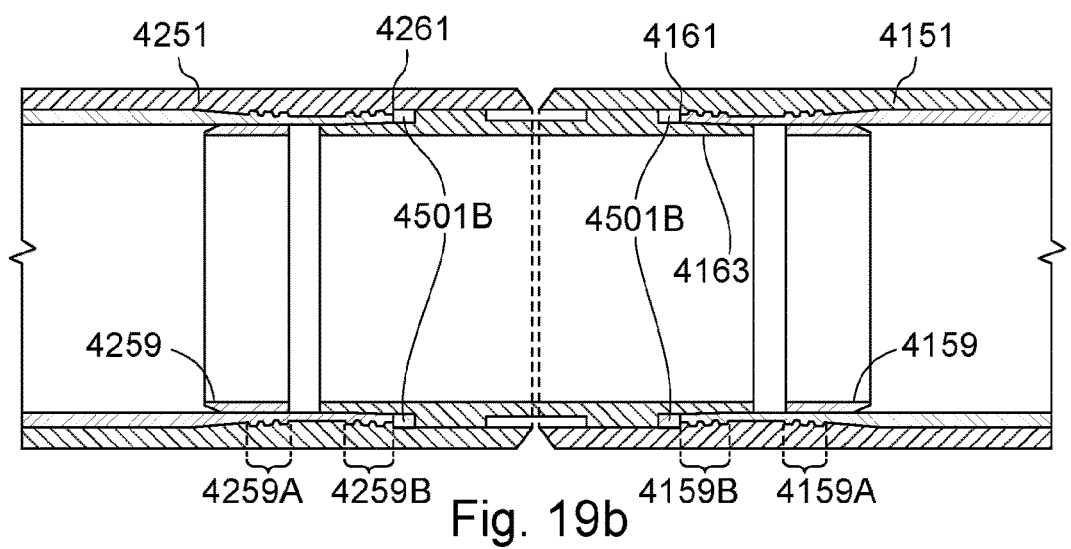
Figure 19C:
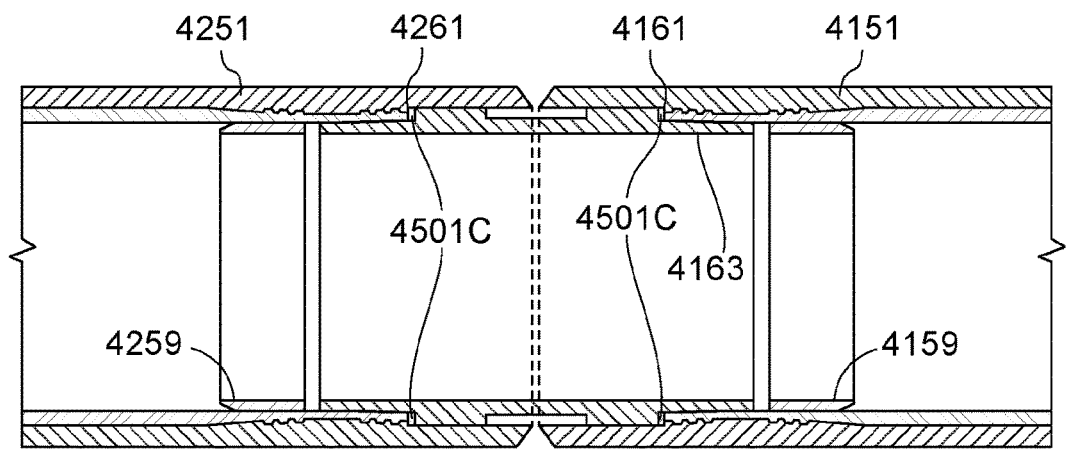

In the embodiment illustrated in FIGS. 19 to 23 there are provided a number (three in this example) of spacer rings 4501A, 4501B, 4501C which are configured to be inserted between the shoulders of the fit-up sleeve 4163 and the insertion rims 4161, 4261 of the fittings 4151, 4251 (or pipes as the case may be), to further control and indeed modify the depth to which the fit-up sleeve 4163 is inserted. FIG. 19 corresponds to FIGS. 11 and 18 of embodiments described above and (a) shows a connector assembly ready for welding to create a joint between respective lined pipes. Located between the shoulders of the fit-up sleeve 4163 and the insertion rims 4161, 4261 are a pair of spacer rings 4501A of a first length A.

If the resulting weld fails or otherwise needs to be repaired or re-made, the weld is cut out and the fit-up sleeve 4163 and the spacer rings 4501A are removed. After re-bevelling the ends of the fittings 4151, 4251 (or pipes as the case may be), a pair of spacer rings 4501B of a second, shorter, length B are inserted and the fit-up sleeve 4163 re-inserted (b). The difference in length of spacer rings 4501B with respect to spacer rings 4501A corresponds to the size of the weld cut-out such that the ends of the fit-up sleeve 4163 extend to the same position relative to the castellation regions 4157, 4257 (discussed further below). Should the resulting repair or re-made weld also need to be repaired or re-made the same process is followed but in this case a pair of spacer rings 4501C of a third, shorter again, length C are inserted and the fit-up sleeve 4163 re-inserted. Again, the difference in length of spacer rings 4501C with respect to spacer rings 4501B corresponds to the size of the weld cut-out such that the ends of the fit-up sleeve extend to the same position relative to the castellation regions 4157, 4257.

Throughout the process of repairing or re-making welds, however many times this is performed (within reason), the sealing rings 4159, 4259 hold the liners 4105, 4205 in place. In this example the number of weld attempts is limited to three but there is no limit on the number of attempts which can be accommodated provided a sufficient number of spacer rings are provided (and the fit-up sleeve is suitably dimensioned).

Figure 20:
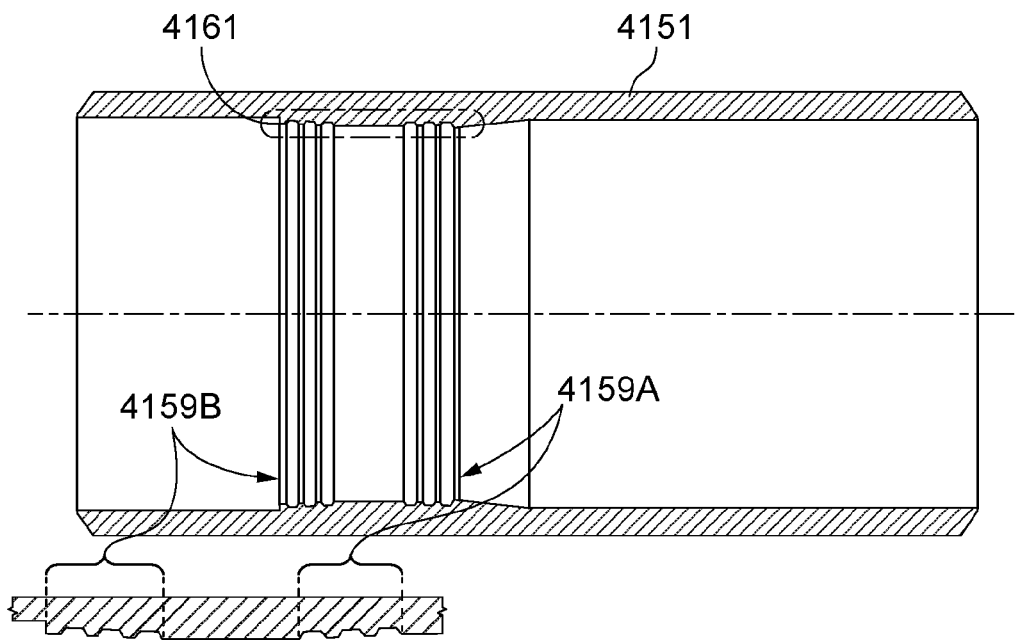
FIG. 20 shows a cross-section of the fitting of the FIG. 19 embodiment.
Figure 21:
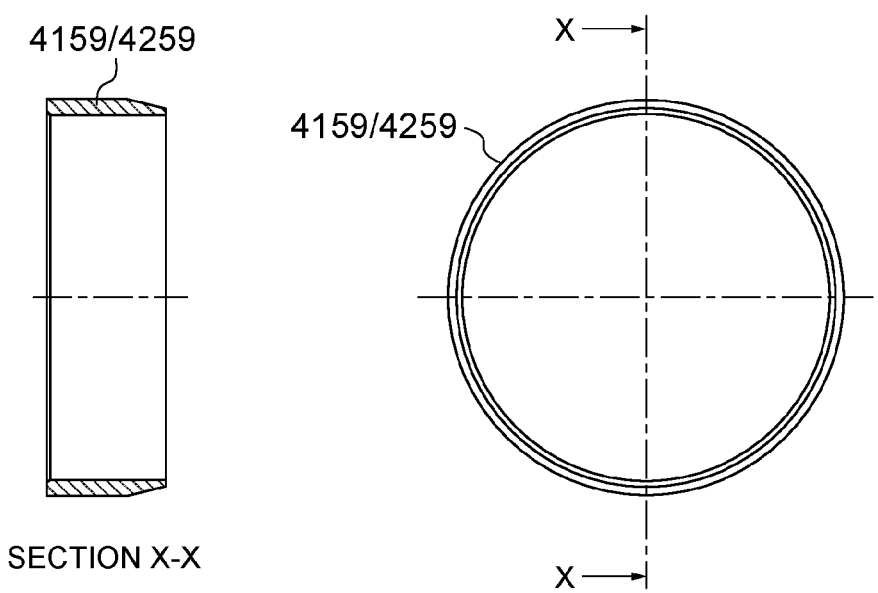
FIG. 21 shows a sealing ring of the FIG. 19 embodiment.
Figure 22:
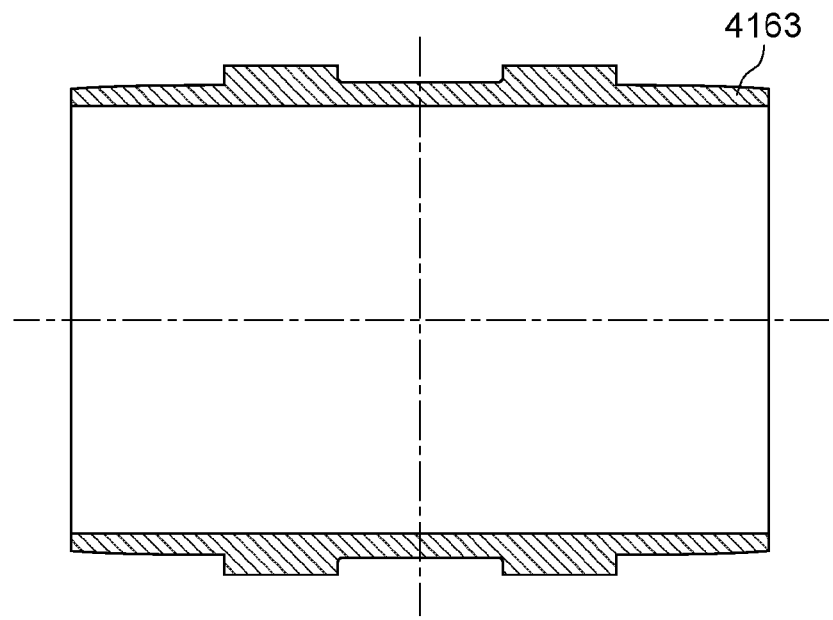
FIG. 22 shows a cross-section of the fit-up sleeve of the FIG. 19 embodiment.
Figure 23:
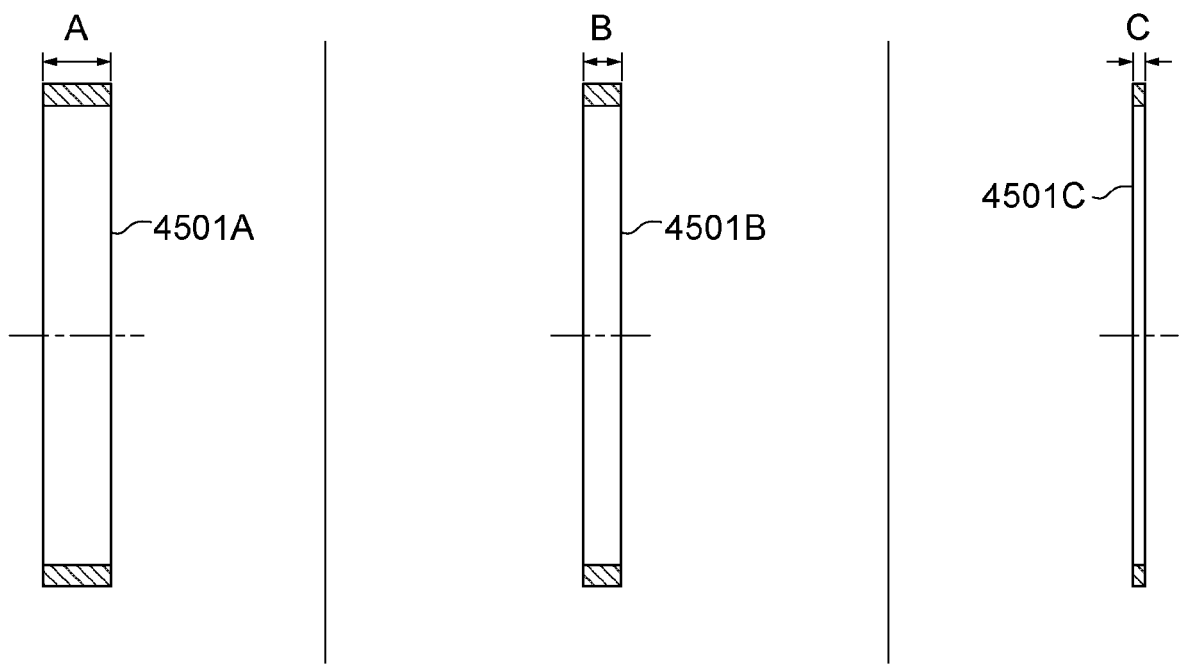
FIGS. 23(a), (b) and (c) shows cross sections of spacer rings corresponding to FIGS. 19(a), (b) and (c)

In this embodiment, the castellation regions 4157, 4257 can be seen to comprise two distinct sets of axially separated castellations 4157A, 4257A and 4157B, 4257B (see FIG. 20 in particular). The first set of castellations 4157A, 4257A correspond to the sealing rings 4159, 4259 that hold the liners 4105, 4205 in place, and the second set of castellations 4157B, 4257B correspond to the liner engaging portions 4165, 4169. As will be apparent by comparing the relative insertion depths of the fit-up sleeve 4163 in each of FIGS. 19(a), (b) and (c) this separation serves to define distinct sealing regions. Of course, it is foreseen that the castellation regions might comprise a single continuous castellation, which may comprise a continuous taper, rather than distinct sets which may be of different tapers or one tapered and one of a constant inner diameter.

FIG. 24 illustrates a variant of the above-described embodiment (although the variation is applicable to any embodiment) in which instead of carrying out an annular girth weld (or other kind of weld) between the fittings (or pipes as the case may be), the fittings (or pipes) are provided with flanges 5199, 5299 which are instead bolted together. Steps leading up to this point may be the same or similar to those steps leading up to (but not including) the final step of welding fittings (or pipes as the case may be) together, although it is envisaged that the flanges may aid in the physical insertion of the sealing ring and the fit-up sleeve in the first fitting. Other means of fastening the flanges 5199, 5299 together May of course be provided. As intimated above, in such an arrangement the action of bringing the flanges 5199, 5299 together by the tightening of bolts, application of a clamp (or clamps), or the like may constitute the final stages of compressing the liners 5105, 5205 between the fit-up sleeve 5163 and the respective castellations 5157, 5257, although it is envisaged that the sealing rings and the fit-up sleeve (or just the fit-up sleeve as the case may be) may deliver the seal alone. This makes the design and the fitting of the flanges much less sensitive in terms of leaks.

Furthermore, as suggested above, spacer rings 5501A may actually be dispensed with as it is possible to match the fit-up sleeve to the flange, and in the event the flange has to be opened after fitting for any reason, there will be no requirement for a metal cut out (as in a re-weld) as the flanges are mechanically joined. In general however it may be preferred to retain the sealing rings, for example to prevent liner movement, although in some embodiments these may also be dispensed with (for example if by design there is an extremely tight fit between the liner and the pipe and/or fitting such that the liner will not move).

The invention provides methods and apparatus for making lined pipelines. Pipes are joined together by attaching fittings at their ends and joining the fittings together. Within the joint there is a fit-up sleeve which forces liners against respective fittings and provides corresponding seals. Other seals can be provided by inserting sealing rings which force different portions of the liners against different portions of the fittings. The fit-up sleeve and sealing rings may force the liners against castellations which prevent movement of the liners. The fit-up sleeve may cooperate with insertion rims on the fittings to provide very accurate spacing, or touching edges which can be desirable if automatic welding is employed. The seals provided by the fit-up sleeve also eliminate backdraughts and assist welding operations. Furthermore, the fit-up sleeve permits pigging through the pipe joint and therefore along the length of the resulting lined pipeline. It is foreseen that the need for CRA components and CRA welding can be largely if not wholly dispensed with.

In hydro tests carried out to evaluate the integrity of pipe joints formed in accordance with the invention, witnessed by Lloyd's Register, a test spool was pressure cycled between zero and 345 bar three times over the course of a week.

During this time no fluid passed the fit up sleeve and the carbon steel surface of the host pipe was untouched by the test water. The invention is therefore already proven capable of use in water injection service without requiring the use of corrosion resistant alloys, and the Applicant expects that further testing will similarly confirm capability for use in hydrocarbon service and, in particular, sour hydrocarbon service.

The above embodiments and any suggested variants are described in context. However, it will be readily understood that each of the embodiments is capable of being combined (in whole or in part) with one or more of the other embodiments (again, in whole or in part). For example, it is foreseen that a joint may be formed in which a first pipe is provided with a fitting comprising a CRA cladding and a second pipe (to which the first will be joined) may be provided with a fitting which does not comprise a CRA cladding. As a further example, the castellations formed directly in the pipe in one or more embodiments might be replaced with grooves as in one or more other embodiments. As a yet further example, where barrier pipe or the Applicant's improved pipe liner is employed, portions of the innermost or porous layer may be removed in variants of those embodiments which do not expressly describe this step.

As may be used herein, the terms bottom, lower, below and the like are descriptive of a feature that is located towards a first end/side of an apparatus, system or component while the terms top, upper, above and the like are descriptive of a feature that is located towards a second, opposing end/side of the apparatus, system or component. Such an apparatus, system or component may be inverted without altering the scope of protection which, as below, is defined by the appended claims. Likewise, terms which are descriptive of movement or direction, such as towards or apart, shall be understood in the broadest sense as referring to relative movement or direction.

Throughout the specification, unless the context demands otherwise, the terms "comprise" or "include", or variations such as "comprises" or "comprising", "includes" or "including" will be understood to imply the inclusion of a stated integer or group of integers, but not the exclusion of any other integer or group of integers.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined in the summary of invention and by the appended claims. For example, and for the avoidance of doubt, the methods and apparatus described herein are not limited to use with pipe liners comprising a barrier layer and/or a porous inner pipe but are also applicable to conventionally lined pipe. Furthermore, it is foreseen that fittings and/or pipes may be joined by mechanical connections such as flanges rather than welding.

The invention claimed is:

1. A method of joining lined pipe, the method comprising:
    joining a first fitting to a first pipe;
    joining a second fitting to a second pipe;
    inserting a first end of a fit-up sleeve into the first fitting to force a first liner against the first fitting;
    inserting a second end of the fit-up sleeve into the second fitting to force a second liner against the second fitting; and
    joining the first fitting to the second fitting;
    wherein internal surfaces of the first and second fittings are provided with a plurality of castellations, and wherein inserting the fit-up sleeve into the first and second fittings forces first portions of the first and second liners against corresponding first portions or sets of the castellations of the first and second fittings.

2. The method of claim 1, further comprising inserting the first liner in the first pipe after joining the first fitting and inserting the second liner in the second pipe after joining the second fitting.

3. The method of claim 2, wherein inserting the first liner in the first pipe comprises reducing the diameter of the first liner and pulling the first liner through the first pipe, or both the first pipe and the first fitting, before allowing the first liner to revert, and wherein inserting the second liner in the second pipe comprises reducing the diameter of the second liner and pulling the second liner through the second pipe, or both the second and pipe and the second fitting, before allowing the second liner to revert.

4. The method of claim 3, wherein reducing the diameter of the liner comprises pulling the liner through a swaging die or one or more rollers, or folding or otherwise deforming the cross-section of the liner.

5. The method of claim 1, comprising trimming each liner back to substantially coincide with an insertion rim of the respective fitting.

6. The method of claim 1, wherein the first pipe comprises a first host pipe and the first liner, wherein the second pipe comprises a second host pipe and the second liner, and wherein the first fitting is joined to the first and second host pipes.

7. The method of claim 1, wherein the liner of each pipe is caused to extend into the corresponding fitting.

8. The method of claim 1, comprising inserting first and second sealing rings within the first and second liners to force second portions of the first and second liners against corresponding second portions or sets of the castellations, prior to inserting the fit-up sleeve.

9. The method of claim 8, further comprising locating an o-ring or a gasket between each of the first and second sealing rings and the fit-up sleeve.

10. The method of claim 1, comprising inserting insulation between the first and second liners and the corresponding first and second pipes prior to joining the fittings to the respective pipes.

11. The method of claim 1, comprising applying one or more cooling jackets to external surfaces of the first and second host pipes prior to joining the fittings to the respective pipes, and/or applying one or more cooling jackets to external surfaces of the fittings before joining the fittings.

12. The method of claim 1, wherein the first and second liners extend to insertion rims of the first and second fittings.

13. The method of claim 12, wherein the first end of the fit-up sleeve abuts the insertion rim of the first fitting and the second end of the fit-up sleeve abuts the insertion rim of the second fitting.

14. The method of claim 13, comprising locating an o-ring or a gasket between the fit-up sleeve and each of the insertion rims.

15. The method of claim 1, comprising welding the first and second fittings to the first and second pipes.

16. The method of claim 1, comprising welding the first fitting to the second fitting.

17. The method of claim 1, wherein inserting the second end of the fit-up sleeve into the second fitting to force the second liner against the second fitting comprises moving the first pipe towards the second pipe after inserting the first end of the fit-up sleeve into the first fitting, or wherein inserting the first end of the fit-up sleeve into the first fitting to force the first liner against the first fitting comprises moving the first pipe towards the second pipe after inserting the second end of the fit-up sleeve into the second fitting.

18. The method of claim 17, wherein moving the first pipe towards the second pipe comprises making a mechanical connection between the first and second pipes, and wherein making the mechanical connection may comprise tightening of one or more bolts or application of one or more clamps.

19. The method of claim 1, comprising re-making a welded pipe joint responsive to determining that the pipe joint comprises an unacceptable weld, wherein re-making the pipe joint comprises:
   cutting through the pipe joint;
   separating the first fitting from the second fitting;
   removing the fit-up sleeve;
   inserting a first end of a replacement fit-up sleeve into the first fitting to force the first liner against the first fitting;
   inserting a second end of the fit-up sleeve into the second fitting to force the second liner against the second fitting; and
   welding the first fitting to the second fitting.

20. The method of claim 19, wherein cutting through the pipe joint and separating the first fitting from the second fitting comprises cutting out a section of the pipe joint containing a weld, wherein the section is of a predetermined length, and wherein the replacement fit-up sleeve is shorter than the removed fit-up sleeve by the predetermined length.

21. The method of claim 1, comprising re-making a welded pipe joint responsive to determining that the pipe joint comprises an unacceptable weld, wherein re-making the pipe joint comprises:
   cutting through the pipe joint;
   separating the first fitting from the second fitting;
   removing the fit-up sleeve;
   removing a first spacer ring from each of the first and second fittings;
   inserting a second spacer ring in each of the first and second fittings;
   re-inserting the first end of the fit-up sleeve into the first fitting to force the first liner against the first fitting;
   re-inserting the second end of the fit-up sleeve into the second fitting to force the second liner against the second fitting; and
   welding the first fitting to the second fitting.

22. The method of claim 21, wherein the second spacer rings are shorter than the first spacer rings by a length corresponding to a size of the weld cut-out, or vice versa.

23. The method of claim 1, wherein the fittings are clad with a corrosion resistant alloy.

24. The method of claim 1, wherein the fittings are comprised only of carbon steel.

25. The method of claim 1, further comprising inserting the first liner in the first pipe before joining the first fitting to the first pipe and inserting the second liner in the second pipe before joining the second fitting to the second pipe.

26. The method of claim 1, wherein the first and second liners are caused to extend into the first and second fittings, respectively, by attaching a towing head to an end of each respective liner and pulling the liner into the respective fitting.

27. The method of claim 1, further comprising cutting the first and second pipes prior to joining the first and second fittings to the respective pipes.

28. The method of claim 1, further comprising forming the plurality of castellations in internal surfaces of the first and second fittings.

29. The method of claim 1, wherein the plurality of castellations are formed in a corrosion resistant alloy cladding applied to the first and second fittings.

30. The method of claim 1, wherein the liner of each pipe comprises an inner polymer pipe and a barrier layer surrounding the inner polymer pipe, wherein the inner polymer pipe is porous.

31. The method of claim 4, wherein the liner of each pipe further comprises an outer polymer pipe surrounding the barrier layer.

32. The method of claim 31, wherein the outer polymer pipe is non porous.

33. The method of claim 32, further comprising inserting first and second sealing rings within the first and second liners to force second portions of the first and second liners against corresponding second portions of the castellations, wherein the sealing rings compress the liners sufficiently to render the inner polymer layers non-porous.

34. The method of claim 1, wherein joining the first fitting to the second fitting results in a joint having an exterior diameter that is substantially the same as exterior diameters of the first and second fittings.

* * * * *